(12) United States Patent
Nishikawa

(10) Patent No.: US 8,815,435 B2
(45) Date of Patent: Aug. 26, 2014

(54) SEPARATOR FOR NONAQUEOUS SECONDARY BATTERY

(75) Inventor: Satoshi Nishikawa, Yamaguchi (JP)

(73) Assignee: Teijin Limited, Osaka (JP)

( * ) Notice: Subject to any disclaimer, the term of this patent is extended or adjusted under 35 U.S.C. 154(b) by 478 days.

(21) Appl. No.: 13/059,894

(22) PCT Filed: Aug. 6, 2009

(86) PCT No.: PCT/JP2009/063951
§ 371 (c)(1),
(2), (4) Date: Feb. 18, 2011

(87) PCT Pub. No.: WO2010/021248
PCT Pub. Date: Feb. 25, 2010

(65) Prior Publication Data
US 2011/0143185 A1 Jun. 16, 2011

(30) Foreign Application Priority Data

Aug. 19, 2008 (JP) .................................. 2008-210751
Aug. 28, 2008 (JP) .................................. 2008-219717
Sep. 11, 2008 (JP) .................................. 2008-233324

(51) Int. Cl.
*H01M 2/16* (2006.01)
*H01M 2/18* (2006.01)
(52) U.S. Cl.
USPC ......................................... 429/144; 429/145
(58) Field of Classification Search
None
See application file for complete search history.

(56) References Cited

U.S. PATENT DOCUMENTS

| 5,856,426 A | 1/1999 | Takahashi et al. |
| 6,447,958 B1 * | 9/2002 | Shinohara et al. ............ 429/248 |
| 2002/0055036 A1 | 5/2002 | Shinohara et al. |
| 2002/0148723 A1 * | 10/2002 | Takata et al. .................. 204/252 |

(Continued)

FOREIGN PATENT DOCUMENTS

| JP | 60-65478 A | 4/1985 |
| JP | 09-208736 A | 8/1997 |

(Continued)

OTHER PUBLICATIONS

Japanese Office Action dated Jul. 13, 2010 in corresponding Japanese Application No. 2009-289113.

*Primary Examiner* — Ula C Ruddock
*Assistant Examiner* — Matthew Van Oudenaren
(74) *Attorney, Agent, or Firm* — Sughrue Mion, PLLC

(57) ABSTRACT

An object of the present invention is to provide a separator for a nonaqueous secondary battery having excellent heat resistance and excellent ion permeation as well as shut-down properties. The first invention is a separator for a nonaqueous secondary battery, comprising a porous composite membrane which includes a substrate comprising a polyolefin microporous membrane and a heat-resistant porous layer comprising a heat-resistant resin, the heat-resistant porous layer being formed on at least one surface of the substrate, wherein the separator is characterized in that the sheet resistance (A) of the substrate, the Gurley value (B) of the substrate, the sheet resistance (C) of the porous composite membrane, and the Gurley value (D) of the porous composite membrane satisfy a specific relationship. The second invention is characterized in that the heat-resistant porous layer has an average pore size of 0.1 to 0.2 μm as measured by mercury intrusion porosimetry. The third invention is characterized in that the heat-resistant resin fibrils have an average fibril diameter of 10 to 80 nm, and the pores in the heat-resistant porous layer have an average pore size of 50 to 250 nm.

10 Claims, 2 Drawing Sheets

(56) References Cited

U.S. PATENT DOCUMENTS

| | | |
|---|---|---|
| 2003/0003363 A1* | 1/2003 | Daido et al. ............. 429/231.95 |
| 2003/0099828 A1* | 5/2003 | Bundo et al. ................... 428/352 |
| 2006/0127753 A1* | 6/2006 | Nakashima et al. .......... 429/142 |
| 2009/0017380 A1 | 1/2009 | Honda et al. |
| 2009/0067119 A1 | 3/2009 | Katayama et al. |

FOREIGN PATENT DOCUMENTS

| | | |
|---|---|---|
| JP | 2000-30686 A | 1/2000 |
| JP | 2000-108249 A | 4/2000 |
| JP | 2000-114107 A | 4/2000 |
| JP | 3175730 B2 | 6/2001 |
| JP | 2001-266949 A | 9/2001 |
| JP | 2002-151044 A | 5/2002 |
| JP | 2002-355938 * | 10/2002 |
| JP | 2002-355938 A | 12/2002 |
| JP | 2006-054127 A | 2/2006 |
| JP | 2006-111712 A | 4/2006 |
| JP | 2006-289657 A | 10/2006 |
| JP | 2008-123996 A | 5/2008 |
| JP | 2008-146963 A | 6/2008 |
| WO | 2006/080265 A1 | 8/2006 |
| WO | 2008/062727 A1 | 5/2008 |
| WO | 2008/062895 A1 | 5/2008 |

* cited by examiner

SEPARATOR FOR NONAQUEOUS SECONDARY BATTERY

TECHNICAL FIELD

The present invention relates to a separator for a nonaqueous secondary battery, and more particularly relates to a technique for improving the nonaqueous secondary battery in safety.

BACKGROUND ART

A nonaqueous secondary battery, which is typified by a lithium-ion secondary battery, has high energy density and has widely spread as a main power source for a mobile electronic device, such as a cell phone or a laptop personal computer. There is a demand for the lithium-ion secondary battery having further increased energy density, but a technical task is to surely achieve the safety of the battery.

The role of the separator in surely achieving the safety of the lithium-ion secondary battery is important and, from the viewpoint of obtaining both high mechanical strength and a shut-down function, a polyethylene microporous membrane is currently being used as a separator. The shut-down function used here indicates a function such that when the temperature of the battery is increased, the pores of the microporous membrane are blocked to cut the current off. This function suppresses heat generation of the battery to prevent heat runaway of the battery.

However, when the temperature is further increased to the melting point of polyethylene constituting the microporous membrane or higher after the shut-down function is exhibited to cut the current off, the microporous membrane per se melts and deforms, so that the current cut-off function deteriorates. As a result, heat runaway of the battery occurs, and not only breakage of the battery itself but also breakage of the device having the battery incorporated and accidents due to firing of the device are caused. Thus, with respect to the separator for use in a lithium-ion secondary battery, for further surely achieving the safety, in addition to the shut-down function, a heat resistance of the microporous membrane is required.

The shut-down function has a working principle such that polyethylene melts to block the pores, and hence is contrary to the heat resistance. Therefore, by a technique for improving the heat resistance by controlling the molecular weight, crystal structure, or the like of polyethylene, a satisfactory heat resistance cannot be obtained.

On the other hand, conventionally, as a technique for improving the heat resistance of the separator, a separator comprising a polyolefin microporous membrane on which a porous membrane of a heat-resistant polymer is stacked has been proposed (see, for example, patent documents 1 to 4).

Patent document 1 is an example in which a nonwoven fabric is stacked on a polyolefin microporous membrane. However, the diameter of fiber cannot be satisfactorily reduced and hence it is difficult to reduce the thickness of a shaped material formed from fibers, such as a nonwoven fabric, and when an attempt is made to reduce the thickness, the voids between the fibers become coarse. For this reason, when exposed to high temperatures, the polyolefin microporous membrane is likely to be broken at the voids between the fibers, and thus does not exhibit a satisfactory heat resistance.

Patent document 2 is an example in which short fibers are incorporated to the inside of a polyolefin microporous membrane. However, this example also uses the short fibers, and therefore poses the problem similar to that of the above patent document 1.

Patent document 3 is an example in which a porous layer comprising a heat-resistant resin is formed on a polyolefin microporous membrane by a phase separation method. In this method, the thickness of the porous layer comprising a heat-resistant resin can be satisfactorily reduced. Further, by appropriately selecting the conditions, the porous layer of a uniform sponge structure can be obtained, and therefore it is considered that the above-mentioned problem about the heat resistance can be avoided. However, in the porous layer disclosed in this document, the porous structure is not appropriate, and the ion permeation is extremely poor.

Patent document 4 is an example in which a ceramic powder is mixed into the heat-resistant porous layer to improve the ion permeation. However, there is no detailed disclosure of the porous structure of the heat-resistant porous layer, and the ion permeation is not satisfactory.

RELATED ART REFERENCES

Patent Documents

Patent document 1: JP-A-2000-108249
Patent document 2: JP-A-2006-054127
Patent document 3: JP-A-2002-355938
Patent document 4: Japanese Patent No. 3175730

SUMMARY OF THE INVENTION

Problems that the Invention is to Solve

As mentioned above, in the conventional separator for a nonaqueous secondary battery having a construction such that a heat-resistant porous layer is added for the purpose of achieving both heat resistance and shut-down properties, the heat resistance and ion permeation are unsatisfactory and the improvement of them is desired.

Accordingly, an object of the present invention is to provide a separator for a nonaqueous secondary battery having excellent heat resistance and excellent ion permeation as well as shut-down properties.

Means for Solving the Problems

The present inventor has made extensive and intensive studies, with a view toward solving the above-mentioned problems, on the separator comprising a polyolefin microporous membrane covered with a heat-resistant porous layer. As a result, it has been found that when the porous structure of the heat-resistant porous layer satisfies a specific requirement, or when the relationship for the porous structure between the polyolefin microporous membrane and the heat-resistant porous layer satisfies a specific requirement, the above problems can be solved, and further excellent battery properties can be achieved. Specifically, the present invention employs the following construction.

1. A separator for a nonaqueous secondary battery, comprising a porous composite membrane which includes a substrate comprising a polyolefin microporous membrane and a heat-resistant porous layer comprising a heat-resistant resin, the heat-resistant porous layer being formed on at least one surface of the substrate, wherein the separator for a nonaqueous secondary battery is characterized in that the sheet resistance (A) of the substrate, the Gurley value (B) of the substrate, the sheet resistance (C) of the porous composite membrane, and the Gurley value (D) of the porous composite membrane satisfy the following formulae (1) to (3):

$$0.005 \leq A/B \leq 0.020 \ [\text{ohm} \cdot \text{cm}^2/(\text{sec}/100 \text{ cc})] \quad (1)$$

$$0.010 \leq C/D \leq 0.025 \ [\text{ohm} \cdot \text{cm}^2/(\text{sec}/100 \text{ cc})] \quad (2)$$

$$A/B < C/D \quad (3)$$

wherein, in formulae (1) to (3), A represents the sheet resistance [ohm·cm²] of the substrate, B represents the Gurley value [sec/100 cc] of the substrate, C represents the sheet resistance [ohm·cm²] of the porous composite membrane, and D represents the Gurley value [sec/100 cc] of the porous composite membrane, wherein the sheet resistance [ohm·cm²] is a value as measured at 20° C. using an electrolytic solution obtained by dissolving LiBF$_4$ in an amount of 1 mol/L in a mixed solvent of propylene carbonate (PC) and ethylene carbonate (EC) in a weight ratio of 1:1.

2. A separator for a nonaqueous secondary battery, comprising a polyolefin microporous membrane having at least one surface covered with a heat-resistant porous layer containing a heat-resistant resin, wherein the separator for a nonaqueous secondary battery is characterized in that the heat-resistant porous layer has an average pore size of 0.1 to 0.2 µm as measured by mercury intrusion porosimetry.

3. The separator for a nonaqueous secondary battery according to item 2 above, characterized in that the polyolefin microporous membrane has an average pore size of 0.05 to 0.5 µm as measured by mercury intrusion porosimetry.

4. A separator for a nonaqueous secondary battery, comprising a polyolefin microporous membrane and a heat-resistant porous layer composed of heat-resistant resin fibrils, the heat-resistant porous layer being stacked on and integrated with at least one surface of the polyolefin microporous membrane, wherein the separator for a nonaqueous secondary battery is characterized in that the heat-resistant resin fibrils have an average fibril diameter of 10 to 80 nm, and the pores in the heat-resistant porous layer have an average pore size of 50 to 250 nm.

5. The separator for a nonaqueous secondary battery according to item 4 above, characterized in that the polyolefin fibrils in the polyolefin microporous membrane have an average fibril diameter of 10 to 300 nm, and the pores in the polyolefin microporous membrane have an average pore size of 10 to 100 nm.

6. The separator for a nonaqueous secondary battery according to item 5 above, characterized in that the polyolefin fibrils have an average fibril diameter of 10 to 100 nm, and the pores in the polyolefin microporous membrane have an average pore size of 10 to 50 nm.

7. The separator for a nonaqueous secondary battery according to any one of items 1 to 6 above, characterized in that the heat-resistant porous layer contains an inorganic filler.

8. The separator for a nonaqueous secondary battery according to item 7 above, characterized in that the inorganic filler comprises a metal hydroxide.

9. The separator for a nonaqueous secondary battery according to item 7 above, characterized in that the inorganic filler comprises a porous filler.

10. The separator for a nonaqueous secondary battery according to any one of items 7 to 9 above, characterized in that the heat-resistant porous layer contains the inorganic filler in an amount of 0.4 to 4 times the volume of the heat-resistant resin.

11. The separator for a nonaqueous secondary battery according to any one of items 7 to 10 above, characterized in that the inorganic filler has an average particle size of 0.1 to 1 µm.

12. The separator for a nonaqueous secondary battery according to any one of items 1 to 11 above, characterized in that the heat-resistant porous layer has a porosity of 20 to 80%.

13. The separator for a nonaqueous secondary battery according to any one of items 1 to 12 above, characterized in that the heat-resistant resin is a wholly aromatic polyamide.

14. The separator for a nonaqueous secondary battery according to item 13 above, characterized in that the wholly aromatic polyamide is a meta-type wholly aromatic polyamide.

15. The separator for a nonaqueous secondary battery according to any one of items 1 to 14 above, characterized in that the heat-resistant porous layer is formed on both surfaces of the polyolefin microporous membrane.

Advantage of the Invention

In the invention, a separator for a nonaqueous secondary battery having excellent heat resistance and excellent ion permeation as well as shut-down properties can be obtained. The separator of the invention is very effective in improving the nonaqueous secondary battery in safety and battery properties.

BEST MODE FOR CARRYING OUT THE INVENTION

Figure 1:
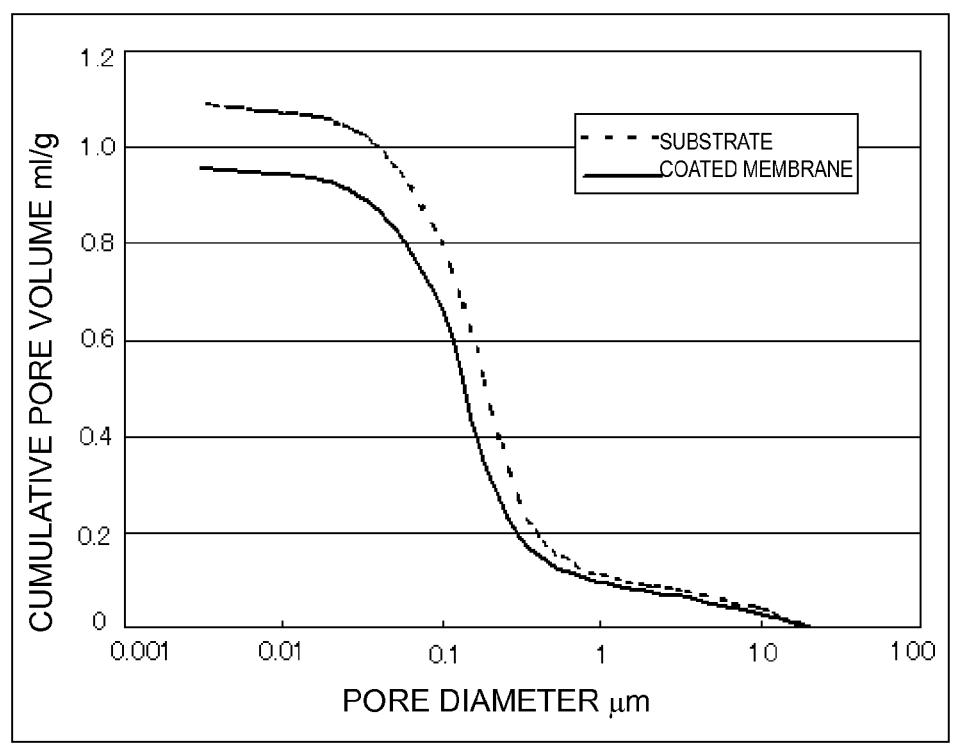
FIG. 1 is a diagram showing an example of the results of the measurement of cumulative pore volume per unit weight (ml/g) against pore diameter (µm) obtained by mercury intrusion porosimetry with respect to each of the substrate and the coated membrane.

The present invention has been made for solving the above problems from various points of view with different approaches, and is classified into the following main three types (I) to (III).

(I) A separator for a nonaqueous secondary battery, comprising a porous composite membrane which includes a substrate comprising a polyolefin microporous membrane and a heat-resistant porous layer comprising a heat-resistant resin, the heat-resistant porous layer being formed on at least one surface of the substrate, wherein the separator for a nonaqueous secondary battery is characterized in that the sheet resistance (A) of the substrate, the Gurley value (B) of the substrate, the sheet resistance (C) of the porous composite membrane, and the Gurley value (D) of the porous composite membrane satisfy the following formulae (1) to (3):

$$0.005 \leq A/B \leq 0.020 \; [\text{ohm} \cdot \text{cm}^2/(\text{sec}/100 \text{ cc})] \tag{1}$$

$$0.010 \leq C/D \leq 0.025 \; [\text{ohm} \cdot \text{cm}^2/(\text{sec}/100 \text{ cc})] \tag{2}$$

$$A/B < C/D \tag{3}$$

wherein, in formulae (1) to (3), A represents the sheet resistance [ohm·cm$^2$] of the substrate, B represents the Gurley value [sec/100 cc] of the substrate, C represents the sheet resistance [ohm·cm$^2$] of the porous composite membrane, and D represents the Gurley value [sec/100 cc] of the porous composite membrane, wherein the sheet resistance [ohm·cm$^2$] is a value as measured at 20° C. using an electrolytic solution obtained by dissolving LiBF$_4$ in an amount of 1 mol/L in a mixed solvent of propylene carbonate (PC) and ethylene carbonate (EC) in a weight ratio of 1:1.

(II) A separator for a nonaqueous secondary battery, comprising a polyolefin microporous membrane having at least one surface covered with a heat-resistant porous layer comprising a heat-resistant resin, wherein the separator for a nonaqueous secondary battery is characterized in that the heat-resistant porous layer has an average pore size of 0.1 to 0.2 μm as measured by mercury intrusion porosimetry.

(III) A separator for a nonaqueous secondary battery, comprising a polyolefin microporous membrane and a heat-resistant porous layer comprising heat-resistant resin fibrils, the heat-resistant porous layer being stacked on and integrated with at least one surface of the polyolefin microporous membrane, wherein the separator for a nonaqueous secondary battery is characterized in that the heat-resistant resin fibrils have an average fibril diameter of 10 to 80 nm, and the pores in the heat-resistant porous layer have an average pore size of 50 to 250 nm.

Hereinbelow, the inventions will be individually described in detail.

First Invention

The separator for a nonaqueous secondary battery of the first invention is a separator for a nonaqueous secondary battery, comprising a porous composite membrane which includes a substrate comprising a polyolefin microporous membrane and a heat-resistant porous layer comprising a heat-resistant resin, the heat-resistant porous layer being formed on at least one surface of the substrate, wherein the separator is characterized in that the sheet resistance (A) of the substrate, the Gurley value (B) of the substrate, the sheet resistance (C) of the porous composite membrane, and the Gurley value (D) of the porous composite membrane satisfy the following formulae (1) to (3).

$$0.005 \leq A/B \leq 0.020 \; [\text{ohm} \cdot \text{cm}^2/(\text{sec}/100 \text{ cc})] \tag{1}$$

$$0.010 \leq C/D \leq 0.025 \; [\text{ohm} \cdot \text{cm}^2/(\text{sec}/100 \text{ cc})] \tag{2}$$

$$A/B < C/D \tag{3}$$

In formulae (1) to (3), A represents the sheet resistance [ohm·cm$^2$] of the substrate, B represents the Gurley value [sec/100 cc] of the substrate, C represents the sheet resistance [ohm·cm$^2$] of the porous composite membrane, and D represents the Gurley value [sec/100 cc] of the porous composite membrane. The sheet resistance [ohm·cm$^2$] is a value as measured at 20° C. using an electrolytic solution obtained by dissolving LiBF$_4$ in an amount of 1 mol/L in a mixed solvent of propylene carbonate (PC) and ethylene carbonate (EC) in a weight ratio of 1:1.

In the first invention, a separator for a nonaqueous secondary battery having excellent heat resistance, excellent ion permeation, excellent charge/discharge characteristics, excellent cycle characteristics, and excellent shut-down properties (SD properties) can be obtained. The separator of the invention is very effective in improving the nonaqueous secondary battery in safety and durability.

(Value Obtained by Dividing the Sheet Resistance by the Gurley Value)

In the invention, it is necessary that a value (A/B) obtained by dividing the sheet resistance (A) of the substrate by the Gurley value (B) of the substrate be 0.005 to 0.020 ohm·cm$^2$/(sec/100 cc). When the A/B is less than 0.005, it is difficult to impregnate the separator with an electrolytic solution, leading to a disadvantage in that the ion permeation is inhibited. Further, in such a case, there is a possibility that the charge/discharge characteristics or cycle characteristics of the battery are adversely affected. On the other hand, when the A/B is more than 0.020, clogging is likely to occur at the interface between the substrate and the coating layer, so that problems derived from the clogging disadvantageously frequently occur. Specific problems derived from the clogging are such that the shut-down properties and ion permeation tend to be lowered, making it difficult to surely achieve the safety of the battery or rendering the charge/discharge characteristics or cycle characteristics unsatisfactory.

Further, it is necessary that a value (C/D) obtained by dividing the sheet resistance (C) of the porous composite membrane by the Gurley value (D) of the porous composite membrane be 0.010 to 0.025 ohm·cm$^2$/(sec/100 cc). When the C/D is less than 0.010, it is difficult to impregnate the separator with an electrolytic solution, so that the ion permeation is disadvantageously lowered, adversely affecting the charge/discharge characteristics or cycle characteristics of the battery. On the other hand, when the C/D is more than 0.025, the thermal shrinkage rate of porous composite membrane is increased, so that the heat resistance of porous composite membrane disadvantageously becomes unsatisfactory.

Furthermore, in the first invention, it is necessary that the relationship: A/B<C/D be satisfied. When the relationship: A/B≤C/D is satisfied, the ion permeation is markedly inhibited, and further the SD properties disadvantageously may be lowered. The reason for this resides in that clogging occurs at the interface between the substrate and the heat-resistant porous layer, and, in such a case, the ion permeation is evenly markedly inhibited. In addition, the SD properties may be lowered depending on the degree of the clogging.

The value obtained by dividing the sheet resistance by the Gurley value is described below from a physical point of view.

The Gurley value in the invention is an index for the gas permeability of a membrane and determined in accordance with JIS P8117. Generally, it is considered that the smaller the Gurley value, the more excellent the gas permeability. A Gurley value is given by the following formula (4).

$$tG = K \cdot (\tau^2 \cdot L)/(\epsilon \cdot d) \tag{4}$$

In formula (4), tG represents a Gurley value (sec/100 cc), K represents a constant of proportionality (0.0778 sec/100 cc), τ represents a curved path ratio (of which unit is dimensionless, and which is an average of the values obtained by dividing a curved path length of an arbitrary curved path by a thickness of the membrane), L represents a thickness (cm) of the membrane, ε represents a porosity (dimensionless), and d represents an average pore size (cm).

The sheet resistance is given by the following formula (5).

$$Rm = (\rho \cdot \tau^2 \cdot L)/\epsilon \tag{5}$$

In formula (5), Rm represents a sheet resistance (ohm·cm$^2$), $\rho$ represents a specific resistance (ohm·cm) of the electrolytic solution, L represents a thickness (cm) of the membrane, and $\epsilon$ represents a porosity (of which unit is dimensionless). The specific resistance $\rho$ of the electrolytic solution is $2.66 \times 10^2$ ohm·cm when the electrolytic solution is 1 mol/L of LiBF$_4$ in PC/EC (1/1 weight ratio) and the temperature is 20° C.

From formulae (4) and (5) above, the average pore size (d) can be determined by the following formula (6).

$$d = (K/\rho) \cdot (Rm/tG) \quad (6)$$

As can be seen from formula (6), a value (Rm/tG) obtained by dividing the sheet resistance by the Gurley value is proportional to the average pore size, and the average pore size is obtained by calculation by applying K/$\rho$, which is determined by the measurement conditions, to the formula. This average pore size d is given as an average radius. In the first invention, K/$\rho$=2.92×10$^{-4}$ sec/100 cc/(ohm·cm). Therefore, specific values for formulae (1) and (2) above are shown in the following formulae (1-A) and (2-A).

$$15 \text{ (nm)} \leq d \leq 58 \text{ (nm)} \quad (1\text{-A})$$

$$29 \text{ (nm)} \leq d \leq 73 \text{ (nm)} \quad (2\text{-A})$$

(Heat-Resistant Porous Layer)

In the invention, the heat-resistant porous layer is a porous covering layer comprising a heat-resistant resin which is stacked on at least one surface of the polyolefin microporous membrane. Further, the heat-resistant porous layer has a number of micropores therein and has a structure such that the micropores are connected with one another, and a gas or liquid can pass through the heat-resistant porous layer from one side to the other.

The heat-resistant resin in the invention involves, in addition to a resin having a melting point of 200° C. or higher, a resin having substantially no melting point and having a heat decomposition temperature of 200° C. or higher. As examples of such heat-resistant resins, there can be mentioned a wholly aromatic polyamide, a polyamideimide, a polyimide, a polysulfone, a polyether sulfone, and a cellulose. Of these, a wholly aromatic polyamide is preferred since a secondary battery having excellent durability can be obtained.

With respect to the wholly aromatic polyamide, there are a meta-type wholly aromatic polyamide and a para-type wholly aromatic polyamide, but the meta-type wholly aromatic polyamide is preferred from the viewpoint of obtaining a secondary battery having more excellent durability, and also preferred from the viewpoint of easily forming a porous structure.

In the invention, the heat-resistant porous layer preferably has a porosity in the range of from 20 to 80%, further preferably in the range of from 40 to 70%, especially preferably in the range of from 50 to 70%. In this case, even when the electrode expands or shrinks during charging or discharging of the battery, an effect is exhibited such that the separator easily follows the deformation of the electrode, so that excellent cycle characteristics can be obtained. The heat-resistant porous layer preferably has a thickness of 2 μm or more from the viewpoint of obtaining a heat resistance. The weight per unit of the heat-resistant porous layer varies depending on the material used and hence cannot be constant, but, generally, it is preferably 2 to 10 g/m$^2$.

(Inorganic Filler)

In the invention, it is preferred that the heat-resistant porous layer contains an inorganic filler. When an inorganic filler is contained in the heat-resistant porous layer, thermal shrinkage of the separator at high temperatures is suppressed, and further the compressive strength of the separator is improved, so that an effect is exhibited such that the separator for a secondary battery is improved in heat resistance. Further, the inorganic filler is also preferred from a viewpoint such that functions characteristic of the inorganic filler per se (e.g., heat resistance, heat conduction properties, flame retardancy, and gas absorption properties) can be added to the function of the separator.

It is preferred that the amount of the inorganic filler contained in the heat-resistant porous layer is 0.4 to 4 times the volume of the heat-resistant resin. When the amount of the inorganic filler contained is less than 0.4 time the volume of the heat-resistant resin, the heat resistance improvement effect of the inorganic filler cannot be satisfactorily obtained. On the other hand, when the amount of the inorganic filler contained is more than 4 times the volume of the heat-resistant resin, the heat-resistant porous layer is likely to be so dense that the ion permeation is lowered. Further, in this case, the heat-resistant porous layer is likely to be brittle, so that the handling properties become markedly poor.

The inorganic filler preferably has an average particle size in the range of from 0.1 to 1 μm. When the average particle size is larger than 1 μm, the occurrence of short-circuiting in the separator exposed to high temperatures cannot be surely prevented, and further it possibly becomes difficult to form a heat-resistant porous layer having an appropriate thickness. When the average particle size is smaller than 0.1 μm, the inorganic filler is easily removed in the powdery form from the separator, so that the handling properties disadvantageously become poor. Further, the use of such a small filler is substantially difficult from the viewpoint of the cost.

With respect to the type of the inorganic filler, there is no particular limitation, but examples include metal oxides, metal nitrides, metal carbides, metal carbonates, and metal hydroxides. Of these, preferred are metal oxides, such as alumina, zirconia, silica, magnesia, and titania, and metal hydroxides, such as aluminum hydroxide and magnesium hydroxide, and, from the viewpoint of achieving excellent dispersibility, especially preferred is alumina or aluminum hydroxide. With respect to the aluminum hydroxide, preferred are one having a gibbsite formulation, one having a bayerite formulation, one having a boehmite formulation, and one having a combination of these formulations, and, of these, one having a gibbsite formulation is preferred.

By the way, when a metal hydroxide, such as aluminum hydroxide or magnesium hydroxide, is used as an inorganic filler, the following advantages are obtained. Specifically, heating a metal hydroxide causes a dehydration reaction to form a metal oxide and generate water. This dehydration reaction is a large endothermic reaction. For this reason, when a separator containing a metal hydroxide is incorporated into a battery, an increase of the battery temperature causes a dehydration reaction, making it possible to render the separator flame retardant. In addition, the combustible electrolytic solution is diluted with the water released, and therefore an effect can be obtained such that not only the separator but also the electrolytic solution are rendered flame retardant, thus effectively rendering the whole of the battery flame retardant. Further, the metal hydroxide is soft, as compared to a metal oxide, such as alumina, and therefore a problem about the handling properties in that the inorganic filler contained in the separator abrades a sheet conveying unit or the like in the manufacturing apparatus does not occur. In the separator covered with a heat-resistant porous layer, generally, the heat-resistant porous layer is easily electrostatically charged and hence tends to lower the handling properties. However, when the heat-resistant porous layer contains a metal hydroxide, attenuation of the electric charge is fast to make it possible to keep the charge at a low level, thus improving the handling properties.

The metal hydroxide preferably causes a dehydration reaction especially at a temperature of 200 to 600° C., more preferably in the range of from 250 to 400° C. In the nonaqueous secondary battery, heat generation caused due to the decomposition reaction of the positive electrode is considered to be the most dangerous, and this decomposition reaction is caused at about 300° C. Therefore, when the temperature at which the dehydration reaction of the metal hydroxide is caused falls within the range of from 200 to 600° C., the heat generation of the battery can be effectively prevented. When the battery is at 200° C. or higher, the negative electrode has almost no activity, and hence does not react with the generated water to cause an exothermic reaction, and the safety is achieved. Further, when the dehydration reaction temperature of the metal hydroxide is 200° C. or higher, no dehydration reaction is caused at a temperature lower than the shut-down temperature of the polyolefin microporous membrane, and therefore the shut-down properties are not adversely affected. When the dehydration reaction temperature of the metal hydroxide is higher than 600° C., there is disadvantageously a danger that the nonaqueous secondary battery cannot be well prevented from suffering heat generation. From this point of view, aluminum hydroxide is preferred because it generally causes a dehydration reaction at a temperature in the range of from 250 to 300° C., and magnesium hydroxide is preferred because it generally causes a dehydration reaction at a temperature in the range of from 350 to 400° C. Further, aluminum hydroxide and magnesium hydroxide are also preferred from the viewpoint of achieving an effect such that they protect the positive electrode from hydrogen fluoride present in the nonaqueous secondary battery to improve the battery in durability.

In addition to the above-mentioned inorganic filler comprising the metal hydroxide, a metal oxide, such as alumina, or another inorganic filler can be used in combination provided that the handling properties and the like are not adversely affected.

On the other hand, with respect to the inorganic filler in the invention, a porous filler is also preferably used from the following viewpoints. Specifically, in the system using an inorganic filler, water or hydrogen fluoride present in a very small amount in the battery reacts with the surface portion of the inorganic filler to promote decomposition of the electrolytic solution or SEI (solid electrolyte interface) film formed on the electrode surface, so that gas is generated in the battery, leading to a lowering of the durability of the battery. Particularly, the heat-resistant resin constituting the heat-resistant porous layer is a substance that generally easily adsorbs water, and therefore the heat-resistant porous layer is likely to contain water in a relatively large amount, and the above-mentioned problem of lowering of the durability is likely to occur. However, by using a porous filler as an inorganic filler, it is possible to trap the generated gas by the porous filler. Therefore, the durability of the battery can be remarkably improved. Further, the porous filler is generally soft, as compared to a dense metal oxide filler, such as α-alumina, and therefore a problem about the handling properties in that the porous filler abrades a sheet conveying unit or the like in the manufacturing apparatus does not occur.

The porous filler preferably has a specific surface area of 40 to 3,000 $m^2/g$, more preferably 40 to 1,000 $m^2/g$, further preferably 40 to 500 $m^2/g$. By using such a porous filler, the activity of water or hydrogen fluoride present in a very small amount in the battery is markedly lowered, making it possible to suppress gas generation due to the decomposition of the electrolyte and the like. Therefore, the durability of the battery can be further improved. When the specific surface area is less than 40 $m^2/g$, the activity of water or hydrogen fluoride disadvantageously cannot be satisfactorily lowered. On the other hand, when the specific surface area is more than 3,000 $m^2/g$, it becomes difficult to form a porous layer, so that the strength of the porous layer is disadvantageously markedly lowered. The specific surface area is determined by an analysis of an adsorption isotherm measured by a nitrogen gas adsorption method using a BET equation (equation introduced by Brunauer, Emmett, and Teller).

Further, the porous filler preferably comprises 50 nm or less mesopores or 2 nm or less micropores, especially preferably has a structure in which 2 nm or less micropores are developed. In this case, the filler easily exhibits the above-mentioned activity lowering effect for water or hydrogen fluoride.

With respect to the porous filler, for example, zeolite, activated carbon, activated alumina, porous silica, or a porous filler obtained by subjecting a metal hydroxide, such as magnesium hydroxide or aluminum hydroxide, to heat treatment can be preferably used. Of these, activated alumina is preferred. The activated alumina used here means a porous filler represented by the rational formula: $Al_2O_3 \cdot xH_2O$ (wherein x can be a value of 0 to 3). It is preferred that the surface of activated alumina is of a structure, such as amorphous $Al_2O_3$, $\gamma$-$Al_2O_3$, $\chi$-$Al_2O_3$, gibbsite-form $Al(OH)_3$, or boehmite-form $Al_2O_3 \cdot H_2O$, and, in this case, the activity lowering effect for water or hydrogen fluoride can be more advantageously obtained. The inorganic filler in the form of a mixture of a porous filler and a nonporous filler may be used.

(Polyolefin Microporous Membrane)

The polyolefin microporous membrane in the invention comprises a polyolefin, and has a number of micropores therein and has a structure such that the micropores are connected with one another, and a gas or liquid can pass through the polyolefin microporous membrane from one side to the other. Examples of polyolefins include polyethylene, polypropylene, polymethylpentene, and combinations thereof. Especially preferred is polyethylene, and preferred polyethylene is high-density polyethylene, a mixture of high-density polyethylene and ultra-high molecular-weight polyethylene, or the like.

In the invention, the polyolefin microporous membrane preferably has a thickness in the range of from 5 to 20 μm. When the thickness is smaller than 5 μm, the mechanical strength is disadvantageously lowered. On the other hand, when the thickness is larger than 20 μm, the output properties of the battery are disadvantageously lowered, or the energy density is disadvantageously lowered. The porosity is preferably in the range of from 20 to 80%, further preferably in the range of from 30 to 60%. When the porosity is lower than 20%, satisfactory ion permeation cannot be obtained, so that the output properties of the battery are lowered. On the other hand, when the porosity is higher than 80%, it is difficult to surely obtain a satisfactory mechanical strength of the separator for battery, and further it is difficult to exhibit excellent shut-down function.

The polyolefin microporous membrane preferably has a Gurley value of 50 to 500 seconds/100 cc, further preferably 100 to 300 seconds/100 cc. The penetration strength as an index for mechanical strength is preferably 200 g or more, further preferably 300 g or more.

(Separator for a Nonaqueous Secondary Battery)

The characteristic feature of the separator for a nonaqueous secondary battery of the invention resides in that, as mentioned above, the pore sizes of the heat-resistant porous layer and the substrate are specified and, by virtue of having such a construction, the heat resistance, excellent ion permeation and shut-down properties can be simultaneously achieved.

In the invention, the separator preferably has a thickness in the range of from 5 to 25 µm. When the thickness of the separator is smaller than 5 µm, it is difficult to obtain a satisfactory mechanical strength such that the separator can be handled. On the other hand, when the thickness is larger than 25 µm, the ion permeation is unsatisfactory, leading to a problem in that the discharge characteristics or low temperature characteristics of the battery are unsatisfactory or the energy density of the battery is lowered.

The separator preferably has a porosity in the range of from 20 to 80%, further preferably in the range of from 40 to 70%. When the porosity is lower than 20%, the ion permeation becomes poor, so that the discharge characteristics are disadvantageously markedly lowered. On the other hand, when the porosity is higher than 80%, a problem arises in that the heat resistance is lowered or the strength is unsatisfactory. For obtaining the separator having a porosity in the above range, as mentioned above, the heat-resistant porous layer preferably has a porosity in the range of from 20 to 80%.

The separator preferably has a Gurley value of 400 seconds/100 cc or less, further preferably 300 seconds/100 cc or less. When the Gurley value is higher than 400 seconds/100 cc, the ion permeation is unsatisfactory, which is disadvantageous from the viewpoint of achieving excellent discharge characteristics and low temperature characteristics of the battery.

With respect to the separator, both the thermal shrinkage rate in the MD direction and that in the TD direction at 175° C. are preferably 20% or less, further preferably 15% or less. By virtue of having the thermal shrinkage rate in the above range, even when the battery is exposed to high temperatures or an accident, such as internal short-circuiting, occurs, the safety can be surely achieved.

In the invention, the heat-resistant porous layer may be formed on at least one surface of the polyolefin microporous membrane, but is further preferably formed on both surfaces of the polyolefin microporous membrane. By forming the heat-resistant porous layer on both surfaces, it is possible to impart higher heat resistance, so that a problem about the handling due to curling is not caused. Further, the heat-resistant porous layer in the invention has an effect such that the film formed on the electrode surface during the charging and discharging is in an excellent form. For this reason, it is preferred that the heat-resistant porous layer is in contact with both the surface of the positive electrode and the surface of the negative electrode from the viewpoint of improving the cycle characteristics of the battery and the durability including storage properties. Therefore, the mode in which the heat-resistant porous layer is formed on both surfaces of the polyolefin microporous membrane is more preferred.

(Method for Producing a Polyolefin Microporous Membrane)

In the invention, with respect to the method for producing a polyolefin microporous membrane as a substrate, there is no particular limitation as long as a polyolefin microporous membrane which satisfies the physical properties of the polyolefin microporous membrane in the invention can be produced, but there can be employed, for example, a method comprising the following steps (i) to (vi):

(i) a step for dissolving a polyolefin composition in a solvent to prepare a solution;

(ii) a step for extruding the solution through a die at a temperature in the range of from the melting point of the polyolefin composition to the melting point+60° C., and cooling the extruded solution to form a gel-form composition;

(iii) a step for subjecting the gel-form composition to stretching;

(iv) a step for subjecting the stretched gel-form composition to heat setting;

(v) a step for removing the solvent; and (vi) a step for annealing.

Examples of the solvents in step (i) above include paraffin, liquid paraffin, paraffin oil, mineral oil, castor oil, tetralin, ethylene glycol, glycerol, decalin, toluene, xylene, diethyltriamine, ethylenediamine, dimethyl sulfoxide, and hexane. Further, with respect to the method for the stretching in step (iii) above, biaxial stretching is preferred, and any of successive biaxial stretching in which longitudinal stretching and transverse stretching are separately conducted and simultaneous biaxial stretching in which longitudinal stretching and transverse stretching are conducted simultaneously can be preferably used.

(Method for Producing a Separator for a Nonaqueous Secondary Battery)

In the invention, with respect to the method for producing a separator for a nonaqueous secondary battery, there is no particular limitation as long as a separator which satisfies the physical properties of the separator of the invention can be produced, but the separator can be produced, for example, through the following steps (i) to (v):

(i) a step for dissolving a heat-resistant resin in a solvent to prepare a coating slurry;

(ii) a step for applying the slurry to at least one surface of a polyolefin microporous membrane;

(iii) a step for treating the polyolefin microporous membrane having the slurry applied thereto with a coagulation liquid capable of coagulating the heat-resistant resin;

(iv) a step for removing the coagulation liquid by washing with water; and (v) a step for drying water.

In step (i) above, with respect to the solvent, there is no particular limitation as long as it is capable of dissolving a heat-resistant resin. Specifically, preferred are polar solvents, and examples include N-methylpyrrolidone, dimethylacetamide, dimethylformamide, and dimethyl sulfoxide. With respect to the solvent, a solvent serving as a poor solvent for the heat-resistant resin can be added to the above polar solvent. By using such a poor solvent, a microphase-separated structure is induced, facilitating the formation of porous structure in the heat-resistant porous layer. With respect to the poor solvent, preferred is an alcohol, and especially preferred is a polyhydric alcohol, such as glycol. The concentration of the heat-resistant resin in the coating slurry is preferably 4 to 9% by weight.

In the construction in which an inorganic filler is contained in the heat-resistant porous layer, in step (i), an inorganic filler may be dispersed in the coating slurry. In this case, when the dispersibility of the inorganic filler is not good, there can be used a method in which the inorganic filler is subjected to surface treatment with a silane coupling agent or the like to improve the dispersibility.

In step (ii) above, the slurry is applied to at least one surface of a polyolefin microporous membrane, but when the heat-resistant porous layer is formed on both surfaces of the polyolefin microporous membrane, it is preferred that the slurry is applied to both surfaces of the polyolefin microporous membrane simultaneously from the viewpoint of shortening the step. Examples of methods for applying the slurry include a knife coater method, a gravure coater method, a screen printing method, a Mayer bar method, a die coater method, a reverse-roll coater method, an ink jet method, a spraying method, and a roll coater method. Of these, a reverse-roll coater method is preferred from the viewpoint of uniformly forming a coating film. When the slurry is applied to both surfaces of the polyolefin microporous membrane simultaneously, for example, there can be mentioned a method in which the polyolefin microporous membrane is passed through a pair of Mayer bars to apply the slurry in an excess amount to both surfaces of the membrane, and the resultant membrane is passed through a pair of reverse-roll coaters to scrape the excess slurry off for precise weighing.

In step (iii) above, the polyolefin microporous membrane having the slurry applied thereto is treated with a coagulation liquid capable of coagulating the heat-resistant resin to coagulate the heat-resistant resin, forming a heat-resistant porous layer, and, in the case of the construction in which an inorganic filler is contained, a porous layer having the inorganic filler bonded is formed. Examples of the methods for treatment with a coagulation liquid include a method in which a coagulation liquid is sprayed onto the polyolefin microporous membrane having the slurry applied thereto using a spray, and a method in which the microporous membrane is immersed in a bath containing a coagulation liquid (coagulation bath). When a coagulation bath is provided, the coagulation bath is preferably provided below the coating apparatus. With respect to the coagulation liquid, there is no particular limitation as long as it is capable of coagulating the heat-resistant resin, but preferred is water or a mixture of the solvent used in the slurry and water in an appropriate amount. The amount of the water mixed is preferably 40 to 80% by weight, based on the coagulation liquid. When the amount of the water is less than 40% by weight, a problem arises in that a prolonged time is required for coagulation of the heat-resistant resin or the coagulation is unsatisfactory. On the other hand, when the amount of the water is more than 80% by weight, a problem arises in that the cost for recovery of the solvent is increased or the coagulation of the surface in contact with the coagulation liquid is so fast that the surface is not rendered satisfactorily porous.

Step (iv) above is a step for removing the coagulation liquid from the sheet obtained after step (iii) above, and a method of washing with water is preferred.

Step (v) above is a step for removing water by drying from the sheet obtained after step (iv) above, and there is no particular limitation with respect to the drying method. The drying temperature is preferably 50 to 80° C., and when using a high drying temperature, it is preferred to employ a method in which the sheet is brought into contact with the roll to prevent a change in size caused due to thermal shrinkage.

(Nonaqueous Secondary Battery)

The separator for a nonaqueous secondary battery of the invention can be applied to any form of nonaqueous secondary battery as long as the nonaqueous secondary battery is in a form such that an electromotive force is obtained by doping and dedoping of lithium. A general nonaqueous secondary battery has a structure in which a battery element impregnated with an electrolytic solution is sealed in an outer casing wherein the battery element comprises a negative electrode and a positive electrode which are stacked through a separator.

The negative electrode has a structure in which a negative electrode composition comprising an anode active material, a conductive auxiliary, and a binder is formed on a current collector. Examples of anode active materials include materials capable of electrochemically doping lithium, such as carbon materials, silicon, aluminum, tin, and Wood's alloy. Examples of conductive auxiliaries include carbon materials, such as acetylene black and ketjen black. The binder comprises an organic polymer, and examples include polyvinylidene fluoride and carboxymethyl cellulose. As a current collector, a copper foil, a stainless steel foil, a nickel foil, or the like can be used.

The positive electrode has a structure in which a positive electrode composition comprising a cathode active material, a conductive auxiliary, and a binder is formed on a current collector. Examples of cathode active materials include lithium-containing transition metal oxides, and specific examples include $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, and $LiFePO_4$. Examples of conductive auxiliaries include carbon materials, such as acetylene black and ketjen black. The binder comprises an organic polymer, and examples include polyvinylidene fluoride. As a current collector, an aluminum foil, a stainless steel foil, a titanium foil, or the like can be used.

The electrolytic solution comprises a lithium salt dissolved in a nonaqueous solvent. Examples of lithium salts include $LiPF_6$, $LiBF_4$, and $LiClO_4$. Examples of nonaqueous solvents include propylene carbonate, ethylene carbonate, dimethyl carbonate, diethyl carbonate, ethylmethyl carbonate, γ-butyrolactone, and vinylene carbonate, and these solvents may be used individually or in combination.

Examples of outer casings include a metal can and an aluminum laminated pack. As examples of shapes of the battery, there can be mentioned a square shape, a cylindrical shape, and a coin shape, but the separator of the invention can be preferably used in any shape of the battery.

Second Invention

The separator for a nonaqueous secondary battery of the second invention is a separator for a nonaqueous secondary battery, which comprises a polyolefin microporous membrane having at least one surface covered with a heat-resistant porous layer containing a heat-resistant resin, wherein the separator is characterized in that the heat-resistant porous layer has an average pore size of 0.1 to 0.2 μm as measured by mercury intrusion porosimetry.

In the second invention, a separator for a nonaqueous secondary battery having excellent heat resistance and excellent charge/discharge characteristics as well as a shut-down function can be obtained. The separator of the invention is very effective in improving the nonaqueous secondary battery in safety and durability.

In the following description, with respect to the construction common to the second invention and the above-mentioned first invention, the explanation is omitted.

(Heat-Resistant Porous Layer)

In the second invention, it is necessary that the heat-resistant porous layer have an average pore size ranging from 0.1 to 0.2 μm. When the average pore size is more than 0.2 μm, the thermal shrinkage rate of the separator is increased, and, in the extreme case, the separator deforms to cause the heat resistance to be poor, for example, the current cut-off function deteriorates. On the other hand, when the average pore size is smaller than 0.1 μm, the separator is lowered in ion permeation, so that the charge/discharge characteristics of the nonaqueous secondary battery become poor.

The average pore size (μm) of the heat-resistant porous layer in the second invention is determined as follows. First, with respect to each of the polyolefin microporous membrane (substrate) and the coated membrane comprising the substrate covered with a heat-resistant porous layer (whole separator), a cumulative pore volume per unit weight (ml/g) is measured against pore diameter by a porosimeter based on the measurement principle of mercury intrusion porosimetry. An example of the results of the measurement is shown in FIG. 1. In FIG. 1, the broken line indicates data measured for the substrate, and the solid line indicates data measured for the coated membrane.

Figure 2:
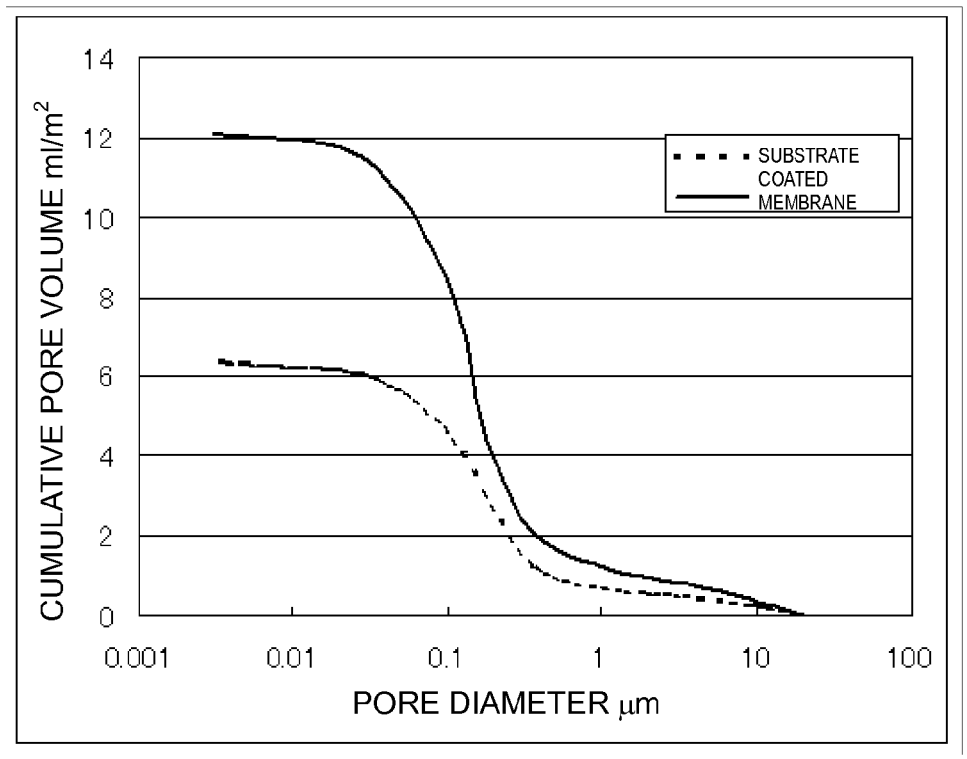
FIG. 2 is a diagram showing an example of the results of the determination of cumulative pore volume per unit area (ml/m²) against pore diameter (µm) obtained by mercury intrusion porosimetry with respect to each of the substrate and the coated membrane.

Then, a cumulative pore volume per unit area (ml/m$^2$) against pore diameter with respect to each of the substrate and the coated membrane is determined by multiplying the cumulative pore volumes (ml/g) of the substrate and coated membrane in the results of the measurement shown in FIG. 1 by the weights per unit (g/m$^2$) of them, respectively. An example of the results of the calculation is shown in FIG. 2. In FIG. 2, the broken line indicates data calculated for the substrate, and the solid line indicates data calculated for the coated membrane.

Figure 3:
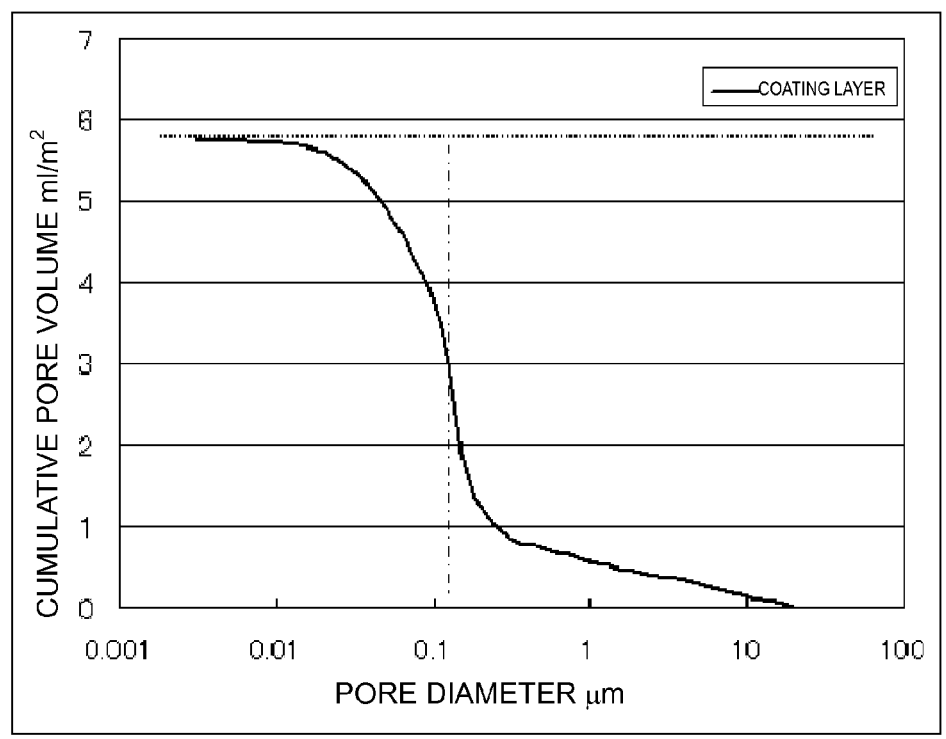
FIG. 3 is a diagram showing an example of the correlation between the difference in cumulative pore volume per unit area (ml/m²) between the substrate and the coated membrane, and the pore diameter (µm).

Further, from the results of the calculation shown in FIG. 2, a difference in cumulative pore volume (ml/m$^2$) between the substrate and the coated membrane is determined. An example of the correlation between the difference in cumulative pore volume per unit area (ml/m$^2$) between the substrate and the coated membrane, and the pore diameter (μm) is shown in FIG. 3. This FIG. 3 shows, in other words, the cumulative pore volume per unit area (ml/m$^2$) against pore diameter (μm) of the heat-resistant porous layer. Then, a pore size corresponding to the pore volume which is ½ of the total pore volume of the heat-resistant porous layer is determined by calculation (corresponding to the dot-dash line in FIG. 3), and this is defined as an average pore size (μm) of the heat-resistant porous layer.

With respect to the porosimeter, a measurement device based on the measurement principle of mercury intrusion porosimetry is used. Examples of porosimeters based on the measurement principle of mercury intrusion porosimetry include commercially available Autoscan-60 Porosimeter, manufactured by Yuasa Ionics Inc., and 60,000 psi Porosimeter, manufactured by American Instrument Company.

In the second invention, the average pore size can be controlled by changing the forming conditions under which the heat-resistant porous layer is stacked on the polyolefin microporous membrane. For example, when the heat-resistant porous layer is formed by a phase separation method, the average pore size can be controlled by changing the concentration of the heat-resistant resin or the amount of the phase separation agent added to the solvent. Alternatively, the average pore size can be controlled by adding an inorganic filler to the coating fluid. Generally, the larger the amount of the phase separation agent or inorganic filler added, the smaller the pore size. Further, the lower the concentration of the heat-resistant resin, the larger the pore size.

(Polyolefin Microporous Membrane)

In the second invention, the polyolefin microporous membrane preferably has an average pore size in the range of from 0.05 to 0.5 μm as measured by mercury intrusion porosimetry. When the average pore size is smaller than 0.05 μm, impregnation properties for the electrolytic solution disadvantageously become poor. On the other hand, when the average pore size is larger than 0.5 μm, it is difficult to obtain excellent shut-down properties. The average pore size of the polyolefin microporous membrane as a substrate is not necessarily smaller than the average pore size of the heat-resistant porous layer. By controlling the average pore size of the polyolefin microporous membrane to be in the above range and controlling the average pore size of the heat-resistant porous layer as mentioned above, excellent ion permeation and excellent heat resistance as well as excellent shut-down properties can be obtained.

Third Invention

The separator for a nonaqueous secondary battery of the third invention is a separator for a nonaqueous secondary battery, which comprises a polyolefin microporous membrane and a heat-resistant porous layer composed of heat-resistant resin fibrils, the heat-resistant porous layer being stacked on and integrated with at least one surface of the polyolefin microporous membrane, wherein the separator is characterized in that the heat-resistant resin fibrils have an average fibril diameter of 10 to 80 nm, and the pores in the heat-resistant porous layer have an average pore size of 50 to 250 nm.

In the third invention, a separator for a nonaqueous secondary battery having both excellent heat resistance and excellent ion permeation can be obtained. The separator of the invention is very effective in improving the nonaqueous secondary battery in safety and battery properties. In addition, the heat-resistant porous layer of this construction is appropriately flexible and hence exhibits an effect such that the SEI film formed on the electrode surface is stabilized, and is excellent in the resistance to oxidation-reduction and hence has an effect to improve the battery in durability. This effect is more remarkable especially when the heat-resistant porous layer is formed on both surfaces of the polyolefin microporous membrane, and, in this case, the heat resistance is also further improved.

In the following description, with respect to the construction common to the third invention and the above-mentioned first invention, the explanation is omitted.

(Heat-Resistant Porous Layer)

In the third invention, it is necessary that the heat-resistant resin fibrils in the heat-resistant porous layer have an average fibril diameter of 10 to 80 nm. When the average fibril diameter is smaller than 10 nm, it is difficult to obtain mechanical physical properties such that thermal shrinkage of the polyolefin microporous membrane as a substrate is surely suppressed. On the other hand, when the average fibril diameter is larger than 80 nm, the ion permeation is disadvantageously inhibited.

Further, in the third invention, it is necessary that the pores in the heat-resistant porous layer have an average pore size of 50 to 250 nm. When the average pore size of the pores in the heat-resistant porous layer is smaller than 50 nm, impregnation properties for the electrolytic solution become poor, making it difficult to obtain satisfactory ion permeation. On the other hand, when the average pore size is larger than 250 nm, it is difficult to obtain a satisfactory heat resistance.

In the third invention, the heat-resistant porous layer preferably has a porosity of 50 to 80%, further preferably 50 to 70%. When the porosity of the heat-resistant porous layer is smaller than 50%, the ion permeation disadvantageously becomes poor. On the other hand, when the porosity is larger than 80%, the heat resistance and mechanical physical properties are disadvantageously lowered.

(Average Fibril Diameter and Average Pore Size in Heat-Resistant Porous Layer)

In the invention, the average fibril diameter of the heat-resistant resin fibrils is determined by making a calculation from the results of the measurement of the volume and surface area of the heat-resistant resin on the assumption that the all constituents of the heat-resistant resin fibrils are cylindrical fibrils. Further, the average pore size of the pores in the heat-resistant porous layer is determined by making a calculation from the results of the measurement of the pore volume and surface area on the assumption that the structures of the all pores are cylindrical. The methods for these calculations are described below in detail.

(1) Surface Area of Heat-Resistant Resin

First, by the below-shown method (method in accordance with JIS Z 8830, i.e., so-called BET method) for measuring a specific surface area using a gas adsorption method, specific surface area St of the separator for a nonaqueous secondary battery, specific surface area Ss of the polyolefin microporous membrane as a substrate, and specific surface area Sf of the inorganic filler are determined.

Specific surface area S is determined from an $N_2$ adsorption of each sample, which is obtained using $N_2$ as an adsorbate, using a BET equation represented by the following formula (7).

$$1/[W \cdot \{(P_0/P)-1\}] = \{(C-1)/(Wm \cdot C)\}(P_0/P)(1/(Wm \cdot C)) \quad (7)$$

In formula (7), P represents a pressure of gas as an adsorbate in the adsorption equilibrium, $P_0$ represents a saturated vapor pressure of the adsorbate in the adsorption equilibrium, W represents an adsorbed amount in the adsorption equilibrium pressure P, Wm represents a monomolecular adsorbed amount, and C represents a BET constant. Relative pressure $P_0/P$ is taken as the x axis and $1/[W \cdot \{(P_0/P)-1\}]$ is taken as the y axis to obtain a linear plot (so-called BET plot). When the slope of this plot is represented by A and the intercept is represented by B, monomolecular adsorbed amount Wm is represented by the following formula (8).

$$Wm = 1/(A+B) \quad (8)$$

Then, specific surface area S is determined from the following formula (9).

$$S = (Wm \cdot N \cdot Acs \cdot M)/w \quad (9)$$

In the above formula, N represents Avogadro's number, M represents a molecular weight, Acs represents an adsorption cross-section, and w represents a sample weight. When $N_2$ is used, adsorption cross-section Acs is 0.16 nm$^2$.

Then, by multiplying the obtained specific surface area S by weight W constituting the sample, a surface area of each of the constituent materials of the sample can be determined. Specifically, when the weight of the heat-resistant resin is represented by Wa, the weight of the inorganic filler is represented by Wf, and the weight of the polyolefin microporous membrane as a substrate is represented by Ws, the surface area of the heat-resistant resin is obtained from $St \cdot (Wa+Wf+Ws)-(Ss \cdot Ws+Sf \cdot Wf)$. The surface area of the polyolefin microporous membrane as a substrate is obtained from $Ss \cdot Ws$.

(2) Average Fibril Diameter of Heat-Resistant Resin Fibrils

The heat-resistant resin in the coating layer is assumed to comprise a fibril fiber material. When the total volume of the fibril fiber material is represented by Vt1, the diameter of the fibril is represented by Rt1, and the total fibril length is represented by Ls1, the following formulae (10) to (12) are given.

$$St \cdot (Wa+Wf+Ws)-(Ss \cdot Ws+Sf \cdot Wf) = \pi \cdot Rt1 \cdot Lt1 \quad (10)$$

$$Vt1 = \pi \cdot (Rt1/2)^2 \cdot Lt1 \quad (11)$$

$$Vt1 = Wa/da \quad (12)$$

In the above formulae, da represents a specific gravity of the heat-resistant resin. From formulae (10) to (12) above, average fibril diameter Rt1 of the heat-resistant resin fibrils can be determined.

(3) Average Pore Size of Pores in Heat-Resistant Porous Layer

The average pore size of the pores in the heat-resistant porous layer is determined by making a calculation using the below-mentioned method from the pore volume of the heat-resistant porous layer and the surface area on the assumption that the pores are cylindrical.

When the total pore volume is represented by Vt2, the diameter of the cylindrical pore is represented by Rt2, and the total length of the cylindrical pore is represented by Lt2, the following formulae (13) to (15) are given.

$$St \cdot (Wa+Wf+Ws)-Ss \cdot Ws = \pi \cdot Rt2 \cdot Lt2 \quad (13)$$

$$Vt2 = \pi \cdot (Rt2/2)^2 \cdot Lt2 \quad (14)$$

$$Vt2 = \epsilon \cdot (Wa/da+Wf/df+Vt2) \quad (15)$$

In the above formulae, Wf represents a weight of the inorganic filler, and df represents a density of the inorganic filler. From formulae (13) to (15) above, average pore size Rt2 of the pores in the heat-resistant porous layer can be determined.

(Polyolefin Microporous Membrane)

In the third invention, the polyolefin fibrils in the polyolefin microporous membrane preferably have an average fibril diameter of 10 to 300 nm, further preferably 10 to 100 nm from the viewpoint of achieving excellent ion permeation. When the average fibril diameter of the polyolefin fibrils is smaller than 10 nm, the thermal shrinkage rate is disadvantageously increased. On the other hand, when the average fibril diameter of the polyolefin fibrils is larger than 300 nm, the ion permeation is disadvantageously inhibited.

The average pore size of the pores in the polyolefin microporous membrane is preferably 10 to 100 nm, further preferably 10 to 50 nm from the viewpoint of achieving excellent ion permeation and shut-down properties. When the average pore size is smaller than 10 nm, impregnation properties for the electrolytic solution become poor, so that the ion permeation may be inhibited, adversely affecting the charge/discharge characteristics of the battery. On the other hand, when the average pore size is larger than 100 nm, clogging is likely to occur at the interface between the substrate and the heat-resistant porous layer, so that the ion permeation may become poor or the shut-down properties may become poor.

In the third invention, the polyolefin microporous membrane preferably has a porosity ranging from 20 to 60%, further preferably ranging from 30 to 60%. Further, the polyolefin microporous membrane preferably has a curved path ratio of 1.2 to 2.5, further preferably 1.2 to 1.8. The curved path ratio used here is defined as a value obtained, with respect to an arbitrary pore, by dividing the length of the pore by the thickness of the membrane.

(Average Fibril Diameter and Average Pore Size in Polyolefin Microporous Membrane)

The polyethylene microporous membrane is assumed to comprise a fibril fiber material, and the pores are assumed to be cylindrical pores. The total volume of the fibril fiber material is represented by Vs1, and the total pore volume is represented by Vs2. When the diameter of the fibril is represented by Rs1, the diameter of the cylindrical pore is represented by Rs2, the total fibril length is represented by Ls1, and the total length of the cylindrical pore is represented by Ls2, the following formulae (16) to (20) are given.

$$Ss \cdot Ws = \pi \cdot Rs1 \cdot Ls1 = \pi \cdot Rs2 \cdot Ls2 \quad (16)$$

$$Vs1 = \pi \cdot (Rs1/2)^2 \cdot Ls1 \quad (17)$$

$$Vs2 = \pi \cdot (Rs/2)^2 \cdot Ls2 \quad (18)$$

$$Vs2 = \epsilon \cdot (Vs1 + Vs2) \tag{19}$$

$$Vs1 = Ws/ds \tag{20}$$

In the above formulae, 8 represents a porosity, and ds represents a specific gravity of polyolefin. From formulae (16) to (20) above, Rs1 and Rs2 can be determined.

(Method for Producing a Polyolefin Microporous Membrane)

The polyolefin microporous membrane used in the third invention can be produced through the steps similar to those described above in the first invention. Particularly, in the third invention, the polyolefin microporous membrane can be obtained by a method, for example, in which a mixed solvent of liquid paraffin and decalin is used as a solvent, the concentration of the polyolefin composition is 15 to 35% by weight, the stretch ratio is 50 to 100 times (longitudinal stretch ratio× transverse stretch ratio), the heat setting temperature is 110 to 140° C., and the annealing temperature is a temperature of the heat setting temperature or lower, but the method is not limited to this.

When the concentration of the polyolefin composition is reduced or the stretch ratio is increased, it is likely that the average fibril diameter becomes smaller or the average pore size becomes larger. On the other hand, when the concentration of the polyolefin composition is increased or the stretch ratio is reduced, it is likely that the average fibril diameter becomes larger or the average pore size becomes smaller. When the heat setting temperature is increased, the average pore size may become larger or the average fibril diameter may become larger, and conversely, when the heat setting temperature is lowered, the average pore size may become smaller or the average fibril diameter may become smaller. When the annealing temperature is increased to higher than the heat setting temperature or marked deformation is caused during the annealing, the average fibril diameter may become larger or the average pore size may become larger. When the concentration of the polyolefin composition is increased to 35% by weight or more, or the heat setting temperature is increased to higher than 140° C., or annealing is performed at a temperature higher than the heat setting temperature, the porosity may become lower than 30%. Further, when marked deformation is caused during the annealing, the porosity may become lower than 30%. When the concentration of the polyolefin composition is reduced to lower than 15% by weight, the porosity may become higher than 60%.

(Method for Producing a Separator for a Nonaqueous Secondary Battery)

The separator for a nonaqueous secondary battery of the third invention can be produced through the steps similar to those described above in the first invention. Particularly, for obtaining a heat-resistant porous layer having an average fibril diameter of 10 to 80 nm and an average pore size of 50 to 250 nm in the third invention, for example, the conditions shown below can be employed.

Specifically, a heat-resistant resin is dissolved in a mixed solvent of dimethylacetamide (DMAc) and tripropylene glycol (TPG) in a weight ratio of 50:50 to 80:20 so that the heat-resistant resin concentration becomes 4.0 to 8.0% by weight to prepare a coating fluid. The prepared coating fluid is applied in an appropriate amount to both surfaces of a polyethylene microporous membrane. The resultant membrane is immersed in a coagulation liquid comprising water: solvent for the coating fluid (mixed solvent of DMAc and TPG)=80:20 to 30:70 in terms of the weight ratio, and subjected to coagulation at 0 to 60° C., and then washed with water and dried to form a heat-resistant porous layer on both surfaces of the polyethylene microporous membrane. By appropriately changing the formulation of the mixed solvent, the concentration of the heat-resistant resin, the formulation of the coagulation liquid, and the temperature, a heat-resistant porous layer having an average fibril diameter of 10 to 80 nm and an average pore size of 50 to 250 nm can be prepared. Further, also by adding an inorganic filler to the coating fluid, the average fibril diameter and pore size can be controlled.

EXAMPLES

Examples for the First Invention

Hereinbelow, various methods for measurements in the Examples of the present invention are described.

[Weight Per Unit]

A sample was cut into a size of 10 cm×10 cm, and a weight of the cut sample was measured. A weight per unit, which is a weight per 1 m², was determined by dividing the weight by the area.

[Coating Weight of Heat-Resistant Porous Layer]

A coating weight of the heat-resistant porous layer was determined by subtracting the weight per unit of the polyolefin microporous membrane from the weight per unit of the composite separator comprising the heat-resistant porous layer and the polyolefin microporous membrane.

[Thickness]

A thickness of a sample was determined by obtaining an average of thickness values measured at 20 points by a contact-type thickness meter (manufactured by Mitutoyo Corporation). A contact terminal in the shape of a cylinder having a bottom with a diameter of 0.5 cm was used.

[Porosity]

When the constituent materials are a, b, c, ..., n, the weights of the constituent materials are Wa, Wb, Wc, ..., Wn (g/cm²), the true densities of the individual materials are xa, xb, xc, ..., xn (g/cm³), and the thickness of the desired layer is represented by t (cm), a porosity $\epsilon$ (%) was determined from the following formula (21).

$$\epsilon = \{1-(Wa/xa+Wb/xb+Wc/xc+\ldots+Wn/xn)/t\} \times 100 \tag{21}$$

[Sheet Resistance]

1) Sheet Resistance of Polyolefin Microporous Membrane

A polyolefin microporous membrane as a sample was cut into a size of 2.6 cm×2.0 cm. The cut sample was immersed in a methanol solution in which a nonionic surfactant (manufactured by Kao Corporation; EMULGEN 210P) is dissolved at 3% by weight, and air-dried. An aluminum foil having a thickness of 20 μm was cut into 2.0 cm×1.4 cm, and to this was attached a lead tab. The two aluminum foils were prepared, and the sample was sandwiched between the aluminum foils so that the aluminum foils suffered no short-circuiting. The sample is impregnated with an electrolytic solution (which is a liquid obtained by dissolving $LiBF_4$ in an amount of 1 mol/L in a mixed solvent of propylene carbonate and ethylene carbonate in a weight ratio of 1:1). The resultant sample was sealed in an aluminum laminated pack under a reduced pressure so that the tab was outside of the aluminum pack. Such cells having the 1, 2, or 3 samples in the aluminum foils were individually prepared. The cell was placed in a thermostatic chamber at 20° C., and a resistance of the cell was measured by an alternating current impedance method at an amplitude of 10 mV and at a frequency of 100 kHz. The measured resistance value of the cell was plotted against the number of the sample(s), and a slope of the resultant approximate linear plot was determined. A sheet resistance per one sample (ohm·cm²) was determined by multiplying the slope by 2.0 cm×1.4 cm which is the electrode area.

2) Sheet Resistance of Separator

A sheet resistance per one separator (ohm·cm²) was determined in substantially the same manner as mentioned above except that a composite separator was used as a sample.

[Gurley Value]

1) Gurley Value of Polyolefin Microporous Membrane

A Gurley value (sec/100 cc) of the polyolefin microporous membrane was measured in accordance with JIS P8117.

2) Gurley Value of Separator

A Gurley value (sec/100 cc) of the separator was determined in substantially the same manner as mentioned above except that a composite separator was used as a sample.

[Thermal Shrinkage Rate]

A separator as a sample was cut into 18 cm (in the MD direction)×6 cm (in the TD direction). On the line halving the sample in the TD direction, positions 2 cm and 17 cm from the upper end (point A and point B) were marked. In addition, on the line halving the sample in the MD direction, positions 1 cm and 5 cm from the left (point C and point D) were marked. The resultant sample was held with a clip (the clip held the sample at a position 2 cm or less from the upper end in the MD direction), and hung in an oven adjusted to 175° C. and subjected to heat treatment under strainless conditions for 30 minutes. The length between two points A and B and the length between two points C and D were measured before and after the heat treatment, and a thermal shrinkage rate was determined from the formulae (22) and (23) below, and this was used as an index for the heat resistance.

Thermal shrinkage rate in *MD* direction={(*AB* Length before heat treatment−*AB* Length after heat treatment)/*AB* Length before heat treatment}×100 (22)

Thermal shrinkage rate in *TD* direction={(*CD* Length before heat treatment−*CD* Length after heat treatment)/*CD* Length before heat treatment}×100 (23)

[Penetration Strength]

Using KES-G5 Handy-type Compression Tester, manufactured by KATO TECH CO., LTD., a penetration test was conducted under conditions such that the curvature radius of the needle tip was 0.5 mm and the penetration speed was 2 mm/sec, and the maximum penetration load was defined as a penetration strength. The sample was held with a metal frame (sample holder) having a hole with a diameter of 11.3 mm, together with a packing made of a silicone rubber.

[Evaluation of Shut-Down (SD) Properties]

First, a separator was punched into a diameter of 19 mm, and immersed in a 3% by weight methanol solution of a nonionic surfactant (manufactured by Kao Corporation; EMULGEN 210P), and air-dried. Then, the separator was impregnated with an electrolytic solution and disposed between SUS plates (diameter: 15.5 mm). As an electrolytic solution, there was used a liquid obtained by dissolving $LiBF_4$ in an amount of 1 mol/L in a mixed solvent of propylene carbonate and ethylene carbonate in a weight ratio of 1:1. The resultant separator was sealed in a 2032-type coin cell. A lead line was introduced from the coin cell, and a thermocouple was attached thereto and the resultant cell was placed in an oven. The temperature was increased at a temperature increase rate of 1.6° C./minute simultaneously with applying an alternating current at an amplitude of 10 mV and at a frequency of 1 kHz, measuring a resistance of the cell.

The sample exhibiting a resistance value of $10^3$ ohm·cm² or more in the above measurement in the range of from 135 to 150° C. was judged to have excellent SD properties (O), and the sample exhibiting a resistance value outside of the above range was judged to have poor SD properties (x).

[Slip Properties]

Using a card abrasion tester, manufactured by TOYO SEIKI SEISAKU-SHO, LTD., an evaluation was made. Specifically, a separator as a sample was attached to a weight of 1 kg (76 mm square), and the resultant weight was placed on a stage made of SUS so that the separator side faced downward. Then, the weight was allowed to slide 10 cm at a speed of 90 cm/minute. The surface of the sample on the side which had been in contact with the SUS stage was observed to check whether or not the surface became black. When the surface became black, the SUS as a material for the stage was judged to be abraded and the sample was rated "x". When the surface did not become black, the SUS was judged not to be abraded and the sample was rated "O".

[Charge Voltage Half Life]

A measurement was conducted using HONESTMETER (manufactured by SHISHIDO ELECTROSTATIC, LTD.; model H0110). The environment for the measurement was at a temperature of 20° C. and at a humidity of 50%. A separator as a sample was fixed to a sample holder so that the distance between the voltage application apparatus and the sample was 20 mm, and a voltage was applied under conditions such that the applied voltage was 5 kV. A voltage attenuation behavior for 3 minutes after saturation of the electrical charge was confirmed, and a half life was determined by making a calculation from the attenuation curve. It is considered that the shorter the withstand voltage half life, the lower the level at which the electrical charge can be kept, or the more excellent the handling properties of the separator.

[Endothermic Reaction]

The endothermic reaction was examined by DSC (differential scanning calorimetry) analysis. As a DSC measurement apparatus, DSC 2920, manufactured by TA Instruments. Japan, was used. A sample for measurement was prepared by weighing 5.5 mg of the separator prepared in each of the Examples and Comparative Examples shown below and placing it in an aluminum pan and caulking them. The measurement was conducted in a nitrogen gas atmosphere at a temperature increase rate of 5° C./min in the temperature range of from 30 to 500° C. An evaluation was made as follows: 0: a significant peak was observed at 200° C. or higher; and x: no peak was observed.

[Evaluation of Battery Properties]

1) Preparation of Nonaqueous Secondary Battery 89.5 Parts by weight of lithium cobalt oxide ($LiCoO_2$; manufactured by Nippon Chemical Industrial CO., LTD.) powder, 4.5 parts by weight of acetylene black (manufactured by DENKI KAGAKU KOGYO KABUSHIKI KAISHA; trade name: DENKA BLACK), and 6 parts by weight of polyvinylidene fluoride (manufactured by KUREHA CORPORATION) were kneaded together using an N-methyl-2-pyrrolidone solvent to prepare a slurry. The obtained slurry was applied to an aluminum foil having a thickness of 20 μm and dried and then pressed to obtain a positive electrode having a thickness of 100 μm.

87 Parts by weight of mesophase carbon microbead (MCMB; manufactured by Osaka Gas Chemicals Co., Ltd.) powder, 3 parts by weight of acetylene black (manufactured by DENKI KAGAKU KOGYO KABUSHIKI KAISHA; trade name: DENKA BLACK), and 10 parts by weight of polyvinylidene fluoride (manufactured by KUREHA CORPORATION) were kneaded together using an N-methyl-2-pyrrolidone solvent to prepare a slurry. The obtained slurry was applied to a copper foil having a thickness of 18 μm and dried and then pressed to obtain a negative electrode having a thickness of 90 μm.

The above-obtained positive electrode and negative electrode were stacked through a separator. The resultant electrode structure was impregnated with an electrolytic solution and sealed in an outer casing comprising an aluminum laminated film to prepare a nonaqueous secondary battery. As the electrolytic solution, 1 mol/L of $LiPF_6$ in ethylene carbonate/ ethylmethyl carbonate (3/7 weight ratio) (manufactured by Kishida Chemical Co., Ltd.) was used.

The prepared battery has a positive electrode area of 2×1.4 $cm^2$, a negative electrode area of 2.2×1.6 $cm^2$, and a set capacity of 8 mAh (in the range of 4.2 V-2.75 V).

2) Charge/Discharge Characteristics

Using the battery prepared by the above-mentioned method, charge/discharge characteristics were evaluated as follows. First, a charge/discharge cycle in which charging was conducted at a constant current (1.6 mA) and at a constant voltage (4.2 V) for 8 hours and discharging was conducted at a constant current (1.6 mA) and at a constant voltage (2.75 V) was repeated 10 times (10 cycles). The discharge capacity obtained in the 10th cycle was defined as a discharge capacity of the battery. Then, charging was conducted at a constant current (1.6 mA) and at a constant voltage (4.2 V) for 8 hours, and discharging was conducted at a constant current (16 mA) and at a constant voltage (2.75 V). The capacity obtained in this cycle was divided by the above-mentioned discharge capacity of the battery in the 10th cycle to obtain a load characteristic value (%). This load characteristic value was used as an index for the charge/discharge characteristics. With respect to this value, an evaluation was made as follows: O: more than 85%; Δ: 70 to 85%; and x: less than 70%.

3) Cycle Characteristics

Using the battery prepared by the above-mentioned method, cycle characteristics were evaluated. First, a charge/ discharge cycle in which charging was conducted at a constant current (1.6 mA) and at a constant voltage (4.2 V) for 8 hours and discharging was conducted at a constant current (1.6 mA) and at a constant voltage (2.75 V) was repeated 10 times (10 cycles). The discharge capacity obtained in the 10th cycle was defined as a discharge capacity of the battery.

Subsequently, the same charge/discharge cycle was repeated 100 times (100 cycles). With respect to the lowering of the discharge capacity in the cycles, an evaluation was made as follows: O: less than 10%; Δ: 10 to 20%; and x: more than 20%.

Example 1-1

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 1:9 ratio (weight ratio) were dissolved in a mixed solvent of liquid paraffin (manufactured by MATSUMURA OIL CO., LTD.; Small P-350P; boiling point: 480° C.) and decalin so that the polyethylene concentration became 30% by weight to prepare a polyethylene solution. The polyethylene solution has the formulation: polyethylene:liquid paraffin:decalin=30:45:25 (weight ratio). The polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.5 times and the stretching temperature was 90° C., and, in the transverse stretching, the stretch ratio was 11.0 times and the stretching temperature was 105° C. After the transverse stretching, heat setting was performed at 125° C. Then, the resultant tape was immersed in a methylene chloride bath to extract the liquid paraffin and decalin. Subsequently, the tape was dried at 50° C., and subjected to annealing treatment at 120° C. to obtain a polyethylene microporous membrane. The polyethylene microporous membrane had a thickness of 13 μm, a weight per unit of 6.44 $g/m^2$, a porosity of 48%, and a penetration strength of 379 g.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M) having an average particle size of 0.8 μm as an inorganic filler to prepare a coating fluid. The coating fluid was adjusted so that the concentration of CONEX in the coating fluid was 5.0% by weight and the [CONEX:aluminum hydroxide] weight ratio was 15:85 (volume ratio 24:76). Then, two Mayer bars were arranged to face each other, and an appropriate amount of the coating fluid was placed on and between them. The above-prepared polyethylene microporous membrane was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water: DMAc:TPG=40:36:24 in terms of the weight ratio, and then washed with water and dried, thus obtaining a separator for a nonaqueous secondary battery of the invention having a heat-resistant porous layer formed on both surfaces of the polyethylene microporous membrane. In the separator, the coating weight of the heat-resistant porous layer on the both surfaces was 5.63 $g/m^2$, and the porosity of the heat-resistant porous layer was 63%. The whole separator had a thickness of 20 μm, a porosity of 53%, and a penetration strength of 346 g.

The sheet resistance (A), Gurley value (B), and sheet resistance (A)/Gurley value (B) value of the polyethylene microporous membrane, and the sheet resistance (C), Gurley value (D), and sheet resistance (C)/Gurley value (D) value of the whole separator are shown in Table 1. Further, the thermal shrinkage rate at 175° C., charge/discharge characteristics, cycle characteristics, SD properties, slip properties, charge voltage half life, and the results of the evaluation of DSC analysis (endothermic reaction at 200° C. or higher) are shown in Table 2. The results of the measurements in the Examples and Comparative Examples below are also shown in Tables 1 and 2.

Example 1-2

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 2:8 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 30% by weight to prepare a polyethylene solution. The polyethylene solution has the formulation: polyethylene:liquid paraffin:decalin=30:68:2 (weight ratio). The polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.8 times and the stretching temperature was 90° C., and, in the transverse stretching, the stretch ratio was 13.0 times and the stretching temperature was 105° C. After the transverse stretching, heat setting was performed at 132° C. Then, the resultant tape was immersed in a methylene chloride bath to extract the liquid paraffin and decalin. Subsequently, the tape was dried at 50° C., and subjected to annealing treatment at 120° C. to obtain a polyethylene microporous membrane. The polyethylene microporous membrane had a thickness of 12 μm, a weight per unit of 7.05 g/m$^2$, a porosity of 38%, and a penetration strength of 335 g.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 70:30. In the resultant polymer solution was dispersed aluminum hydroxide (manufactured by SHOWA DENKO K. K.; H-43M) having an average particle size of 0.8 μm to prepare a coating fluid. The coating fluid was adjusted so that the concentration of CONEX in the coating fluid was 5.0% by weight and the [CONEX:aluminum hydroxide] weight ratio was 20:80 (volume ratio 31:69). Then, two Mayer bars were arranged to face each other, and an appropriate amount of the coating fluid was placed on and between them. The above-prepared polyethylene microporous membrane was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water:DMAc:TPG=30:49:21 in terms of the weight ratio, and then washed with water and dried, thus obtaining a separator for a nonaqueous secondary battery of the invention having a heat-resistant porous layer formed on both surfaces of the polyethylene microporous membrane. In the separator, the coating weight of the heat-resistant porous layer on the both surfaces was 5.21 g/m$^2$, and the porosity of the heat-resistant porous layer was 64%. The whole separator had a thickness of 19 μm, a porosity of 48%, and a penetration strength of 346 g.

Example 1-3

A separator for a nonaqueous secondary battery of the invention was obtained in substantially the same manner as in Example 1-1 except that magnesium hydroxide (manufactured by Kyowa Chemical Industry Co., Ltd.; KISUMA 5P) having an average particle size of 0.8 μm was used as an inorganic filler. In the separator, the coating weight of the heat-resistant porous layer on the both surfaces was 5.05 g/m$^2$, and the porosity of the heat-resistant porous layer was 66%. The whole separator had a thickness of 20 μm, a porosity of 54%, and a penetration strength of 351 g.

Example 1-4

Aluminum hydroxide (manufactured by SHOWA DENKO K. K.; H-43M) was subjected to heat treatment at 280° C. to obtain activated alumina having a porous structure and having an average particle size of 0.8 μm and a specific surface area of 400 m$^2$/g. With respect to the obtained activated alumina, an XRD analysis was conducted. As a result, it was found that the activated alumina was mainly of an amorphous bulk structure having mixed thereinto a boehmite phase in an extremely slight amount.

Then, a separator for a nonaqueous secondary battery of the invention was obtained in substantially the same manner as in Example 1-1 except that the above-mentioned activated alumina was used as an inorganic filler. In the separator, the coating weight of the heat-resistant porous layer on the both surfaces was 4.77 g/m$^2$, and the porosity of the heat-resistant porous layer was 69%. The whole separator had a thickness of 19 μm, a porosity of 55%, and a penetration strength of 349 g.

Example 1-5

A separator for a nonaqueous secondary battery of the invention was obtained in substantially the same manner as in Example 1-1 except that α-alumina (manufactured by SHOWA DENKO K. K.; AL160SG-3) having an average particle size of 0.6 μm was used as an inorganic filler. In the separator, the coating weight of the heat-resistant porous layer on the both surfaces was 6.65 g/m$^2$, and the porosity of the heat-resistant porous layer was 64%. The whole separator had a thickness of 19 μm, a porosity of 53%, and a penetration strength of 355 g.

Comparative Example 1-1

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 7:3 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 17% by weight to prepare a polyethylene solution. The polyethylene solution has the formulation: polyethylene:liquid paraffin:decalin=17:51:32 (weight ratio). Into the polyethylene solution was added and dispersed silica powder (manufactured by TOKUYAMA Corp.; TOKUSIL) in an amount 0.2 time the weight of the polyethylene to prepare a slurry. The resultant polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.5 times and the stretching temperature was 90° C., and, in the transverse stretching, the stretch ratio was 13.0 times and the stretching temperature was 105° C. After the transverse stretching, heat setting was performed at 138° C. Then, the resultant tape was immersed in a methylene chloride bath to extract the liquid paraffin and decalin. Subsequently, the tape was dried at 50° C., and subjected to annealing treatment at 120° C., and further dipped in an acidic aqueous solution to remove silica, thus obtaining a polyethylene microporous membrane. The polyethylene microporous membrane had a thickness of 13 μm, a weight per unit of 4.45 g/m$^2$, a porosity of 64%, and a penetration strength of 234 g.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M) having an average particle size of 0.8 μm to prepare a coating fluid. The coating fluid was adjusted so that the concentration of CONEX in the coating fluid was 5.0% by weight and the [CONEX:aluminum hydroxide] weight ratio was 20:80 (volume ratio 31:69). Then, two Mayer bars were arranged to face each other, and an appropriate amount of the coating fluid was placed on and between them. The above-prepared polyethylene microporous membrane was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water:DMAc:TPG=30:42:28 in terms of the weight ratio, and then washed with water and dried, thus obtaining a separator for a nonaqueous secondary battery having a heat-resistant porous layer formed on both surfaces of the polyethylene microporous membrane. In the separator, the coating weight of the heat-resistant porous layer on the both surfaces was 5.85 g/m$^2$, and the porosity of the heat-resistant porous layer was 65%. The whole separator had a thickness of 21 μm, a porosity of 64%, and a penetration strength of 255 g.

Comparative Example 1-2

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 1:9 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 30% by weight to prepare a polyethylene solution. The polyethylene solution has the formulation: polyethylene:liquid paraffin:decalin=30:45:25 (weight ratio). The polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.5 times and the stretching temperature was 90° C., and, in the transverse stretching, the stretch ratio was 13.0 times and the stretching temperature was 105° C. After the transverse stretching, heat setting was performed at 138° C. Then, the resultant tape was immersed in a methylene chloride bath to extract the liquid paraffin and decalin. Subsequently, the tape was dried at 50° C., and subjected to annealing treatment at 120° C. to obtain a polyethylene microporous membrane. The polyethylene microporous membrane had a thickness of 12 μm, a weight per unit of 7.87 g/m$^2$, a porosity of 31%, and a penetration strength of 359 g.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 50:50. In the resultant polymer solution was dispersed aluminum hydroxide (manufactured by SHOWA DENKO K. K.; H-43M) having an average particle size of 0.8 μm to prepare a coating fluid. The coating fluid was adjusted so that the concentration of CONEX in the coating fluid was 4.0% by weight and the [CONEX:aluminum hydroxide] weight ratio was 50:50 (volume ratio 64:36). Then, two Mayer bars were arranged to face each other, and an appropriate amount of the coating fluid was placed on and between them. The above-prepared polyethylene microporous membrane was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 60° C. comprising water:DMAc:TPG=60:20:20 in terms of the weight ratio, and then washed with water and dried, thus obtaining a separator for a nonaqueous secondary battery having a heat-resistant porous layer formed on both surfaces of the polyethylene microporous membrane. In the separator, the coating weight of the heat-resistant porous layer on the both surfaces was 3.25 g/m$^2$, and the porosity of the heat-resistant porous layer was 83%. The whole separator had a thickness of 23 μm, a porosity of 56%, and a penetration strength of 361 g.

Comparative Example 1-3

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 1:9 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 30% by weight to prepare a polyethylene solution. The polyethylene solution has the formulation: polyethylene:liquid paraffin:decalin=30:45:25 (weight ratio). The polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.5 times and the stretching temperature was 90° C., and, in the transverse stretching, the stretch ratio was 11.0 times and the stretching temperature was 105° C. After the transverse stretching, heat setting was performed at 125° C. Then, the resultant tape was immersed in a methylene chloride bath to extract the liquid paraffin and decalin. Subsequently, the tape was dried at 50° C., and subjected to annealing treatment at 120° C. to obtain a polyethylene microporous membrane. The polyethylene microporous membrane had a thickness of 13 μm, a weight per unit of 6.44 g/m$^2$, a porosity of 48%, and a penetration strength of 379 g.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M) having an average particle size of 0.8 μm to prepare a coating fluid. The coating fluid was adjusted so that the concentration of CONEX in the coating fluid was 5.0% by weight and the [CONEX:aluminum hydroxide] weight ratio was 20:80 (volume ratio 31:69). Then, two Mayer bars were arranged to face each other, and an appropriate amount of the coating fluid was placed on and between them. The above-prepared polyethylene microporous membrane was passed through the Mayer bars having the coating fluid placed thereon to apply the coating fluid to both surfaces of the polyethylene microporous membrane. The clearance between the Mayer bars was set to 30 µm, and the number of both of the two Mayer bars used was #6. The resultant membrane was immersed in a coagulation liquid at 30° C. comprising water:DMAc:TPG=30:42:28 in terms of the weight ratio, and then washed with water and dried, thus obtaining a separator for a nonaqueous secondary battery having a heat-resistant porous layer formed on both surfaces of the polyethylene microporous membrane. In the separator, the coating weight of the heat-resistant porous layer on the both surfaces was 6.46 g/m², and the porosity of the heat-resistant porous layer was 66%. The whole separator had a thickness of 22 µm, a porosity of 55%, and a penetration strength of 331 g.

is found that when the requirements in the invention are satisfied, a separator excellent in all the heat resistance, SD properties, charge/discharge characteristics, and cycle characteristics can be obtained.

Figure 4:
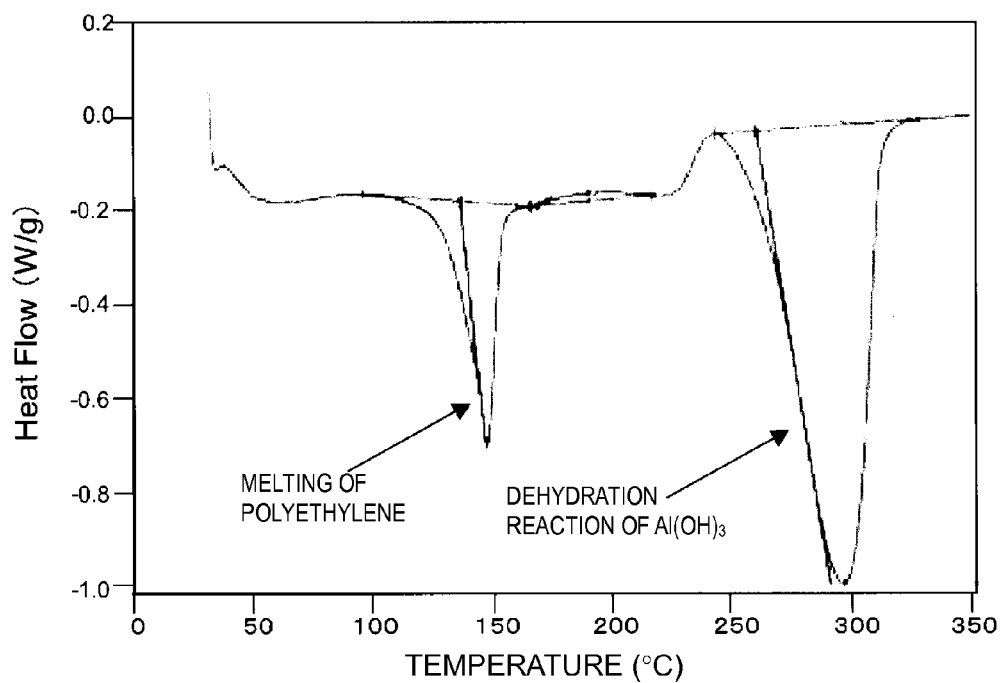
FIG. 4 is a graph showing the results of DSC analysis with respect to the separator of the invention.

The types of inorganic fillers are discussed below. The results of DSC analysis with respect to Example 1-1 are shown in FIG. 4. In FIG. 4, an endothermic peak derived from the melting of polyethylene has been observed at 110 to 160° C., and further a large endothermic peak derived from the dehydration reaction of aluminum hydroxide has been observed at 250 to 320° C. From these results, it is found that in Example 1-1, when the polyethylene microporous membrane melts to cause shut-down and then further exposed to higher temperatures, aluminum hydroxide undergoes a dehydration reaction accompanied by a large endothermic reac-

TABLE 1

| | Polyethylene microporous membrane | | | Whole separator | | |
|---|---|---|---|---|---|---|
| | Gurley value B (sec/100 cc) | Sheet resistance A (ohm · cm²) | A/B (ohm · cm²/ (sec/100 cc)) | Gurley value D (sec/100 cc) | Sheet resistance C (ohm · cm²) | C/D (ohm · cm²/ (sec/100 cc)) |
| Example 1-1 | 188 | 2.256 | 0.012 | 275 | 3.85 | 0.014 |
| Example 1-2 | 162 | 3.257 | 0.02 | 178 | 4.061 | 0.023 |
| Example 1-3 | 188 | 2.256 | 0.012 | 289 | 4.335 | 0.015 |
| Example 1-4 | 188 | 2.256 | 0.012 | 295 | 5.605 | 0.019 |
| Example 1-5 | 188 | 2.256 | 0.012 | 265 | 4.505 | 0.017 |
| Comparative Example 1-1 | 54 | 2.97 | 0.055 | 288 | 10.944 | 0.038 |
| Comparative Example 1-2 | 148 | 3.404 | 0.023 | 215 | 5.805 | 0.027 |
| Comparative Example 1-3 | 188 | 2.256 | 0.012 | 408 | 4.262 | 0.01 |

TABLE 2

| | Thermal shrinkage rate MD/TD (%) | Charge/ discharge characteristics | Cycle characteristics | SD properties | Slip properties | Withstand voltage half life (min) | Endothermic reaction |
|---|---|---|---|---|---|---|---|
| Example 1-1 | 9/9 | ○ | ○ | ○ | ○ | 8 | ○ |
| Example 1-2 | 10/10 | ○ | ○ | ○ | ○ | 9 | ○ |
| Example 1-3 | 9/10 | ○ | ○ | ○ | ○ | 15 | ○ |
| Example 1-4 | 9/9 | ○ | ○ | ○ | ○ | 6 | x |
| Example 1-5 | 8/9 | ○ | ○ | ○ | x | 95 | x |
| Comparative Example 1-1 | 8/9 | x | x | x | ○ | 9 | ○ |
| Comparative Example 1-2 | 36/47 | Δ | Δ | ○ | ○ | 14 | ○ |
| Comparative Example 1-3 | 8/10 | Δ | Δ | ○ | ○ | 9 | ○ |

As apparent from the results shown in Tables 1 and 2, in Examples 1-1 to 1-5, A/B and C/D are within their respective ranges in the invention and A/B<C/D is satisfied, and therefore all the heat resistance, charge/discharge characteristics, cycle characteristics, and SD properties are excellent. On the other hand, in Comparative Example 1-1, A/B largely exceeds 0.020, C/D largely exceeds 0.025, and further the requirement: A/B<C/D is not satisfied, and therefore the SD properties, discharge characteristics, and cycle characteristics are poor. Further, in Comparative Example 1-2, A/B exceeds 0.020 and C/D exceeds 0.025, and therefore the heat resistance is poor, and the charge/discharge characteristics and cycle characteristics are slightly poor. Furthermore, in Comparative Example 1-3, the requirement: A/B<C/D is not satisfied, and therefore the charge/discharge characteristics and cycle characteristics are slightly poor. From the above, it tion. Also in Example 1-2 in which aluminum hydroxide was similarly used as an inorganic filler, the similar results of DSC analysis have been obtained. Further, in Example 1-3 in which magnesium hydroxide was used as an inorganic filler, although not shown in figure, in addition to the endothermic peak derived from the melting of polyethylene, a large endothermic peak at 350 to 400° C. derived from the dehydration reaction of magnesium hydroxide has been observed. On the other hand, in Example 1-4 in which activated alumina was used as an inorganic filler, and in Example 1-5 in which α-alumina was used as an inorganic filler, no significant endothermic peak has been observed in the region of temperature higher than 200° C. From this, it is found that when a metal hydroxide is used as an inorganic filler, excellent flame retardant effect can be obtained.

In addition, it is found that in each of Examples 1-1 to 1-4 in which a metal hydroxide or activated alumina was used as an inorganic filler, the slip properties are excellent and the handling properties are excellent. Further, it is found that in each of Examples 1-1 to 1-3 in which a metal hydroxide was used as an inorganic filler, the destaticizing effect is excellent.

Examples for the Second Invention

Hereinbelow, various methods for measurements in the Examples of the second invention are described. With respect to the same methods for measurements as those in the Examples of the first invention, the explanations are omitted.
[Average Pore Size of Polyolefin Microporous Membrane]

In the measurement of pore size by mercury intrusion porosimetry, AutoPore IV model 9510, manufactured by Micromeritics Instrument Corporation, was used. The range of the measurement of pore size was 10 to 0.003 µm. With respect to the average pore size, the pore size exhibiting a cumulative pore volume corresponding to ½ of the maximum cumulative pore volume obtained in the range of the measurement was defined as an average pore size of the polyolefin microporous membrane.
[Average Pore Size of Heat-Resistant Porous Layer]

In the measurement of pore size by mercury intrusion porosimetry, AutoPore IV model 9510, manufactured by Micromeritics Instrument Corporation, was used. The range of the measurement of pore size was 10 to 0.003 µm. First, with respect to each of the polyolefin microporous membrane as a substrate (hereinafter, substrate) and the polyolefin microporous membrane covered with a heat-resistant porous layer (hereinafter, coated membrane), a pore size distribution is determined by mercury intrusion porosimetry. The obtained pore size distribution curve is the cumulative pore volume per 1 g of the sample (amount of the intruded mercury: ml/g) against pore size (µm). Then, a cumulative pore volume per 1 $m^2$ of the sample (ml/$m^2$) is determined by multiplying the cumulative pore volume per 1 g of the sample by the weight per unit (g/$m^2$) of the sample. Thus, pore size distribution curves for the pore volume per 1 $m^2$ of the sample (ml/$m^2$) against pore size (µm) with respect to the substrate and coated membrane are obtained. In the pore size distribution curves, a difference between the coated membrane and the substrate is determined to obtain a pore size distribution curve with respect to the heat-resistant porous layer for the cumulative pore volume per 1 $m^2$ of the heat-resistant porous layer (ml/$m^2$) against pore size (µm). The pore size exhibiting a cumulative pore volume corresponding to ½ of the maximum cumulative pore volume obtained in the range of the measurement was defined as an average pore size of the heat-resistant porous layer.

Example 2-1

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 1:9 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 30% by weight to prepare a polyethylene solution. The polyethylene solution has the formulation: polyethylene:liquid paraffin:decalin=30:45:25 (weight ratio). The polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.5 times and the stretching temperature was 90° C., and, in the transverse stretching, the stretch ratio was 11.0 times and the stretching temperature was 105° C. After the transverse stretching, heat setting was performed at 125° C. Then, the resultant tape was immersed in a methylene chloride bath to extract the liquid paraffin and decalin. Subsequently, the tape was dried at 50° C., and subjected to annealing treatment at 120° C. to obtain a polyethylene microporous membrane. The polyethylene microporous membrane had a thickness of 12 µm, a weight per unit of 5.82 g/$m^2$, a porosity of 53%, an average pore size of 0.15 µm, a penetration strength of 350 g, a Gurley value of 173 seconds/100 cc, and a sheet resistance of 1.901 ohm·$cm^2$.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 50:50. In the resultant polymer solution was dispersed aluminum hydroxide (manufactured by SHOWA DENKO K. K.; H-43M) having an average particle size of 0.8 µm as an inorganic filler to prepare a coating fluid. The coating fluid was adjusted so that the concentration of CONEX in the coating fluid was 5.0% by weight and the [CONEX:aluminum hydroxide] weight ratio was 20:80 (volume ratio 31:69). Then, two Mayer bars were arranged to face each other, and an appropriate amount of the coating fluid was placed on and between them. The above-prepared polyethylene microporous membrane was passed through the Mayer bars having the coating fluid placed thereon to apply the coating fluid to both surfaces of the polyethylene microporous membrane. The clearance between the Mayer bars was set to 30 µm, and the number of both of the two Mayer bars used was #6. The resultant membrane was immersed in a coagulation liquid at 40° C. comprising water: DMAc:TPG=50:30:20 in terms of the weight ratio, and then washed with water and dried, thus obtaining a separator for a nonaqueous secondary battery of the invention having a heat-resistant porous layer formed on both surfaces of the polyethylene microporous membrane. In the separator, the coating weight of the heat-resistant porous layer on the both surfaces was 6.84 g/$m^2$, and the porosity of the heat-resistant porous layer was 59%. The separator had a thickness of 20 µm, a porosity of 53%, and a penetration strength of 331 g.

The average pore size of the heat-resistant porous layer, and the thermal shrinkage rate, Gurley value, and sheet resistance of the separator are shown in Table 3. Those in the other Examples and Comparative Examples are also shown in Table 3.

Example 2-2

The same polyethylene microporous membrane as that in Example 2-1 was used as a substrate.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M) having an average particle size of 0.8 µm as an inorganic filler to prepare a coating fluid. The coating fluid was adjusted so that the concentration of CONEX in the coating fluid was 5.0% by weight and the [CONEX:aluminum hydroxide] weight ratio was 20:80 (volume ratio 31:69). Then, two Mayer bars were arranged to face each other, and an appropriate amount of the coating fluid was placed on and between them. The polyethylene microporous membrane was passed through the Mayer bars having the coating fluid placed thereon to apply the coating fluid to both surfaces of the polyethylene microporous membrane. The clearance between the Mayer bars was set to 30 µm, and the number of both of the two Mayer bars used was #6. The resultant membrane was immersed in a coagulation liquid at 30° C. comprising water:DMAc:TPG=70:18:12 in terms of the weight ratio, and then washed with water and dried, thus obtaining a separator for a nonaqueous secondary battery of the invention having a heat-resistant porous layer formed on both surfaces of the polyethylene microporous membrane. In the separator, the coating weight of the heat-resistant porous layer on the both surfaces was 5.87 g/m$^2$, and the porosity of the heat-resistant porous layer was 59%. The separator had a thickness of 19 µm, a porosity of 53%, and a penetration strength of 349 g.

Example 2-3

The same polyethylene microporous membrane as that in Example 2-1 was used as a substrate.

Then, a separator for a nonaqueous secondary battery of the invention was obtained by substantially the same method as in Example 2-1 except that the coating fluid was applied to one surface of the polyethylene microporous membrane. In the separator, the coating weight of the heat-resistant porous layer was 6.60 g/m$^2$, and the porosity of the heat-resistant porous layer was 60%. The separator had a thickness of 20 µm, a porosity of 54%, and a penetration strength of 342 g.

Example 2-4

The same polyethylene microporous membrane as that in Example 2-1 was used as a substrate.

Into an N-methyl-2-pyrrolidone (NMP) solution (RIKA-COAT; manufactured by New Japan Chemical Co., Ltd.) of a polyimide resin having a polymer concentration of 20% was added and dispersed aluminum hydroxide (manufactured by SHOWA DENKO K. K.; H-43M) having an average particle size of 0.8 µm in an amount 4 times (2.2 times in terms of the volume ratio) the weight of the polymer. The resultant slurry was diluted with NMP so that the polymer concentration for the NMP became 4.5% by weight to prepare a coating fluid.

Two Mayer bars were arranged to face each other, and an appropriate amount of the coating fluid was placed on and between them. The polyethylene microporous membrane was passed through the Mayer bars having the coating fluid placed thereon to apply the coating fluid to both surfaces of the polyethylene microporous membrane. The clearance between the Mayer bars was set to 30 µm, and the number of both of the two Mayer bars used was #6. The resultant membrane was immersed in a coagulation liquid at 50° C. comprising water:NMP=50:50 in terms of the weight ratio, and then washed with water and dried, thus obtaining a separator for a nonaqueous secondary battery of the invention having a heat-resistant porous layer formed on both surfaces of the polyethylene microporous membrane. In the separator, the coating weight of the heat-resistant porous layer on the both surfaces was 5.94 g/m$^2$, and the porosity of the heat-resistant porous layer was 59%. The separator had a thickness of 19 µm, a porosity of 53%, and a penetration strength of 388 g.

Comparative Example 2-1

The same polyethylene microporous membrane as that in Example 2-1 was used as a substrate.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 80:20. In the resultant polymer solution was dispersed aluminum hydroxide (manufactured by SHOWA DENKO K. K.; H-43M) having an average particle size of 0.8 µm as an inorganic filler to prepare a coating fluid. The coating fluid was adjusted so that the concentration of CONEX in the coating fluid was 7.0% by weight and the [CONEX:aluminum hydroxide] weight ratio was 20:80 (volume ratio 31:69). Then, two Mayer bars were arranged to face each other, and an appropriate amount of the coating fluid was placed on and between them. The polyethylene microporous membrane was passed through the Mayer bars having the coating fluid placed thereon to apply the coating fluid to both surfaces of the polyethylene microporous membrane. The clearance between the Mayer bars was set to 30 µm, and the number of both of the two Mayer bars used was #6. The resultant membrane was immersed in a coagulation liquid at 20° C. comprising water:DMAc:TPG=80:16:4 in terms of the weight ratio, and then washed with water and dried, thus obtaining a separator for a nonaqueous secondary battery having a heat-resistant porous layer formed on both surfaces of the polyethylene microporous membrane. In the separator, the coating weight of the heat-resistant porous layer on the both surfaces was 6.94 g/m$^2$, and the porosity of the heat-resistant porous layer was 52%. The separator had a thickness of 19 µm, a porosity of 50%, and a penetration strength of 344 g.

Comparative Example 2-2

The same polyethylene microporous membrane as that in Example 2-1 was used as a substrate.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 50:50. In the resultant polymer solution was dispersed aluminum hydroxide (manufactured by SHOWA DENKO K. K.; H-43M) having an average particle size of 0.8 µm as an inorganic filler to prepare a coating fluid. The coating fluid was adjusted so that the concentration of CONEX in the coating fluid was 4.0% by weight and the [CONEX:aluminum hydroxide] weight ratio was 80:20 (volume ratio 88:12). Then, two Mayer bars were arranged to face each other, and an appropriate amount of the coating fluid was placed on and between them. The polyethylene microporous membrane was passed through the Mayer bars having the coating fluid placed thereon to apply the coating fluid to both surfaces of the polyethylene microporous membrane. The clearance between the Mayer bars was set to 30 µm, and the number of both of the two Mayer bars used was #6. The resultant membrane was immersed in a coagulation liquid at 50° C. comprising water:DMAc:TPG=40:30:30 in terms of the weight ratio, and then washed with water and dried, thus obtaining a separator for a nonaqueous secondary battery having a heat-resistant porous layer formed on both surfaces of the polyethylene microporous membrane. In the separator, the coating weight of the heat-resistant porous layer on the both surfaces was 3.05 g/m$^2$, and the porosity of the heat-resistant porous layer was 73%. The separator had a thickness of 20 μm, a porosity of 59%, and a penetration strength of 330 g.

TABLE 3

| | Average pore size (μm) | Thermal shrinkage rate (%) | | Sheet resistance (ohm · cm$^2$) | Gurley value (sec/100 cc) |
|---|---|---|---|---|---|
| | | MD | TD | | |
| Example 2-1 | 0.16 | 14 | 12 | 2.586 | 229 |
| Example 2-2 | 0.12 | 14 | 12 | 2.604 | 240 |
| Example 2-3 | 0.17 | 17 | 16 | 2.568 | 228 |
| Example 2-4 | 0.14 | 17 | 15 | 2.958 | 267 |
| Comparative Example 2-1 | 0.06 | 13 | 11 | 8.054 | 464 |
| Comparative Example 2-2 | 0.24 | 58 | 49 | 2.389 | 214 |

As apparent from the results shown in Table 3, the separators in Examples 2-1 to 2-4 in which the average pore size is within the range in the invention individually have low thermal shrinkage rates in the MD and TD and hence are excellent in heat resistance. Further, the separators in Examples 2-1 to 2-4 individually have a low Gurley value and a low sheet resistance, and therefore exhibit excellent ion permeation, and thus achieve excellent charge/discharge characteristics when applied to a battery. On the other hand, the separator in Comparative Example 2-1 in which the average pore size is smaller than the range in the invention has a high Gurley value and a large sheet resistance, and therefore exhibits poor ion permeation, and cannot achieve satisfactory charge/discharge characteristics when applied to a battery. Further, the separator in Comparative Example 2-2 in which the average pore size is larger than the range in the invention has a large thermal shrinkage rate and hence is poor in heat resistance.

[Evaluation of Handling Properties]

The separators in Examples 2-1 to 2-3 were individually subjected to heat treatment at 150° C. for 30 minutes. After the heat treatment, the resultant separator was observed to check whether or not curling occurred, and the separator having a curling degree of 10° or more was rated "Curling occurred", and the separator having a curling degree of 10° or less was rated "No curling". As a result, the separators in Examples 2-1 and 2-2 were rated No curling, whereas the separator in Example 2-3 was rated Curling occurred. From this, it is found that the separator having the heat-resistant porous layer formed on both surfaces has excellent handling properties. Further, this separator is considered to also have high reliability when exposed to high temperatures.

[Evaluation of Durability]

89.5 Parts by weight of lithium cobalt oxide (LiCoO$_2$; manufactured by Nippon Chemical Industrial CO., LTD.) powder, 4.5 parts by weight of acetylene black (manufactured by DENKI KAGAKU KOGYO KABUSHIKI KAISHA; trade name: DENKA BLACK), and 6 parts by weight of polyvinylidene fluoride (manufactured by KUREHA CORPORATION) were kneaded together using an N-methyl-2-pyrrolidone solvent to prepare a slurry. The obtained slurry was applied to an aluminum foil having a thickness of 20 μm and dried and then pressed to obtain a positive electrode having a thickness of 100 μm.

87 Parts by weight of mesophase carbon microbead (MCMB; manufactured by Osaka Gas Chemicals Co., Ltd.) powder, 3 parts by weight of acetylene black (manufactured by DENKI KAGAKU KOGYO KABUSHIKI KAISHA; trade name: DENKA BLACK), and 10 parts by weight of polyvinylidene fluoride (manufactured by KUREHA CORPORATION) were kneaded together using an N-methyl-2-pyrrolidone solvent to prepare a slurry. The obtained slurry was applied to a copper foil having a thickness of 18 μm and dried and then pressed to obtain a negative electrode having a thickness of 90 μm.

The above-obtained positive electrode and negative electrode were stacked through a separator. The resultant electrode structure was impregnated with an electrolytic solution and sealed in an outer casing comprising an aluminum laminated film to prepare a nonaqueous secondary battery. As the electrolytic solution, 1 mol/L LiPF$_6$ ethylene carbonate/ethylmethyl carbonate (3/7 weight ratio) (manufactured by Kishida Chemical Co., Ltd.) was used.

The prepared battery has a positive electrode area of 2×1.4 cm$^2$, a negative electrode area of 2.2×1.6 cm$^2$, and a set capacity of 8 mAh (in the range of 4.2 V-2.75 V).

Using, as a separator, the separators for nonaqueous secondary battery prepared in Examples 2-1, 2-3, and 2-4 and the polyethylene microporous membrane prepared in Example 2-1, nonaqueous secondary batteries were individually prepared as mentioned above. When the separator in Example 2-3 was used, a battery in which the heat-resistant porous layer was arranged on the positive electrode side and a battery in which the heat-resistant porous layer was arranged on the negative electrode side were individually prepared. These batteries were charged to 4.2 V or 4.3 V and then subjected to trickle charge test at 60° C. and at 4.2 V or 4.3 V for 200 hours. The battery in which current leakage occurred in the test and a current of 1 mA or more flowed was evaluated as poor durability and rated "x", the battery having a leakage current of 1 mA or less but 300 μA or more was rated "Δ", and the battery having a leakage current of 300 μA or less was rated "O". The results are shown in Table 4.

TABLE 4

| Separator | | 4.2 V | 4.3 V |
|---|---|---|---|
| Example 2-1 | | ○ | ○ |
| Example 2-3 | Heat-resistant porous layer is on positive electrode side | ○ | Δ |
| | Heat-resistant porous layer is on negative electrode side | ○ | Δ |
| Example 2-4 | | ○ | x |
| Polyethylene microporous membrane | | x | x |

From Table 4, it is found that the separator having the heat-resistant porous layer formed on both surfaces has more excellent durability than that of the separator having the heat-resistant porous layer formed only on one surface, and that the aromatic polyamide has especially excellent durability.

Examples for the Third Invention

Hereinbelow, various methods for measurements in the Examples of the third invention are described. With respect to the same methods for measurements as those in the Examples of the first invention, the explanations are omitted.

[Specific Surface Area]

A specific surface area was determined by a nitrogen gas adsorption method from a BET equation. The measurement was conducted by a three-point method using NOVA-1200 (manufactured by Yuasa Ionics Inc.).

[Coating Thickness]

A coating thickness was determined by subtracting the thickness of the substrate from the thickness of the separator.

Example 3-1

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 2:8 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 30% by weight to prepare a polyethylene solution. The polyethylene solution has the formulation: polyethylene: liquid paraffin:decalin=30.0:67.5:2.5 (weight ratio). The polyethylene solution was extruded through a die at 148° C., and cooled in a water bath to prepare a gel-form tape (base tape). The base tape was dried at 60° C. for 8 minutes and at 95° C. for 15 minutes, and the resultant base tape was stretched by biaxial stretching in which longitudinal stretching and transverse stretching are successively conducted. In the longitudinal stretching, the stretch ratio was 5.8 times and the stretching temperature was 90° C., and, in the transverse stretching, the stretch ratio was 13.5 times and the stretching temperature was 105° C. After the transverse stretching, heat setting was performed at 132° C. Then, the resultant tape was immersed in a methylene chloride bath to extract the liquid paraffin and decalin. Subsequently, the tape was dried at 50° C., and subjected to annealing treatment at 120° C. to obtain a polyethylene microporous membrane. The obtained polyethylene microporous membrane is referred to as substrate 1. The construction and physical properties of substrate 1 are shown in Table 5.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M; specific surface area: 9.4 m$^2$/g) having an average particle size of 0.8 μm as an inorganic filler to prepare a coating fluid. The coating fluid was adjusted so that the concentration of CONEX in the coating fluid was 5.0% by weight and the [CONEX:aluminum hydroxide] weight ratio was 20:80 (volume ratio 31:69). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water:DMAc:TPG=70:18:12 in terms of the weight ratio, and then washed with water and dried, thus obtaining a separator for a nonaqueous secondary battery of the invention having a heat-resistant porous layer formed on both surfaces of the polyethylene microporous membrane. The construction of the prepared separator is shown in Table 6, and the physical properties are shown in Table 7.

Example 3-2

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M; specific surface area: 9.4 m$^2$/g) having an average particle size of 0.8 μm as an inorganic filler to prepare a coating fluid. The coating fluid was adjusted so that the concentration of CONEX in the coating fluid was 5.5% by weight and the [CONEX:aluminum hydroxide] weight ratio was 20:80 (volume ratio 31:69). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water:DMAc:TPG=70:18:12 in terms of the weight ratio, and then washed with water and dried, thus obtaining a separator for a nonaqueous secondary battery of the invention having a heat-resistant porous layer formed on both surfaces of the polyethylene microporous membrane. The construction of the prepared separator is shown in Table 6, and the physical properties are shown in Table 7.

Example 3-3

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M; specific surface area: 9.4 m$^2$/g) having an average particle size of 0.8 μm as an inorganic filler to prepare a coating fluid. The coating fluid was adjusted so that the concentration of CONEX in the coating fluid was 5.0% by weight and the [CONEX:aluminum hydroxide] weight ratio was 15:85 (volume ratio 24:76). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water:DMAc:TPG=70:18:12 in terms of the weight ratio, and then washed with water and dried, thus obtaining a separator for a nonaqueous secondary battery of the invention having a heat-resistant porous layer formed on both surfaces of the polyethylene microporous membrane. The construction of the prepared separator is shown in Table 6, and the physical properties are shown in Table 7.

Example 3-4

As polyethylene powder, GUR2126 (weight average molecular weight: 4,150,000; melting point: 141° C.) and GURX143 (weight average molecular weight: 560,000; melting point: 135° C.), each of which is manufactured by Ticona, were used. GUR2126 and GURX143 in a 1:9 ratio (weight ratio) were dissolved in a mixed solvent of liquid paraffin (manufactured by MATSUMURA OIL CO., LTD.; Smoil P-350P; boiling point: 480° C.) and decalin so that the polyethylene concentration became 30% by weight to prepare a polyethylene solution. The polyethylene solution has the formulation: polyethylene:liquid paraffin:decalin=30.0:45.0:25.0 (weight ratio). The polyethylene solution was extruded through a die at 148° C., and cooled in a water bath to prepare a gel-form tape (base tape). The base tape was dried at 60° C.

for 8 minutes and at 95° C. for 15 minutes, and the resultant base tape was stretched by biaxial stretching in which longitudinal stretching and transverse stretching are successively conducted. In the longitudinal stretching, the stretch ratio was 5.5 times and the stretching temperature was 90° C., and, in the transverse stretching, the stretch ratio was 10.5 times and the stretching temperature was 105° C. After the transverse stretching, heat setting was performed at 135° C. Then, the resultant tape was immersed in a methylene chloride bath to extract the liquid paraffin and decalin. Subsequently, the tape was dried at 50° C., and subjected to annealing treatment at 120° C. with a relaxation degree of 10% in the MD direction to obtain a polyethylene microporous membrane. The obtained polyethylene microporous membrane is referred to as substrate 2. The construction and physical properties of substrate 2 are shown in Table 5.

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 60:40. In the resultant polymer solution was dispersed aluminum hydroxide (manufactured by SHOWA DENKO K. K.; H-43M; specific surface area: 9.4 $m^2/g$) having an average particle size of 0.8 μm as an inorganic filler to prepare a coating fluid. The coating fluid was adjusted so that the concentration of CONEX in the coating fluid was 5.3% by weight and the [CONEX:α-alumina] weight ratio was 25:75 (volume ratio 37:63). Then, two Mayer bars were arranged to face each other, and an appropriate amount of the coating fluid was placed on and between them. Substrate 2 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 35° C. comprising water:DMAc:TPG=60:24:16 in terms of the weight ratio, and then washed with water and dried, thus obtaining a separator for a nonaqueous secondary battery of the invention having a heat-resistant porous layer formed on both surfaces of the polyethylene microporous membrane. The construction of the prepared separator is shown in Table 6, and the physical properties are shown in Table 7.

Example 3-5

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 50:50. In the resultant polymer solution was dispersed α-alumina (manufactured by SHOWA DENKO K. K.; AL160-SG3; specific surface area: 8.4 $m^2/g$) having an average particle size of 0.6 μm as an inorganic filler to prepare a coating fluid. The coating fluid was adjusted so that the concentration of CONEX in the coating fluid was 5.2% by weight and the [CONEX:aluminum hydroxide] weight ratio was 12:88 (volume ratio 29:71). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 30° C. comprising water:DMAc:TPG=40:30:30 in terms of the weight ratio, and then washed with water and dried, thus obtaining a separator for a nonaqueous secondary battery of the invention having a heat-resistant porous layer formed on both surfaces of the polyethylene microporous membrane. The construction of the prepared separator is shown in Table 6, and the physical properties are shown in Table 7.

Comparative Example 3-1

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 50:50. In the resultant polymer solution was dispersed aluminum hydroxide (manufactured by SHOWA DENKO K. K.; H-43M; specific surface area: 9.4 $m^2/g$) having an average particle size of 0.8 μm as an inorganic filler to prepare a coating fluid. The coating fluid was adjusted so that the concentration of CONEX in the coating fluid was 4.0% by weight and the [CONEX:aluminum hydroxide] weight ratio was 25:75 (volume ratio 38:62). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 60° C. comprising water:DMAc:TPG=40:30:30 in terms of the weight ratio, and then washed with water and dried, thus obtaining a separator for a nonaqueous secondary battery having a heat-resistant porous layer formed on both surfaces of the polyethylene microporous membrane. The construction of the prepared separator is shown in Table 6, and the physical properties are shown in Table 7.

Comparative Example 3-2

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 80:20. In the resultant polymer solution was dispersed aluminum hydroxide (manufactured by SHOWA DENKO K. K.; H-43M; specific surface area: 9.4 $m^2/g$) having an average particle size of 0.8 μm as an inorganic filler to prepare a coating fluid. The coating fluid was adjusted so that the concentration of CONEX in the coating fluid was 7.0% by weight and the [CONEX:aluminum hydroxide] weight ratio was 55:45 (volume ratio 38:62). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 40° C. comprising water:DMAc:TPG=70:24:6 in terms of the weight ratio, and then washed with water and dried, thus obtaining a separator for a nonaqueous secondary battery having a heat-resistant porous layer formed on both surfaces of the polyethylene microporous membrane. The construction of the prepared separator is shown in Table 6, and the physical properties are shown in Table 7.

Comparative Example 3-3

CONEX (registered trademark; manufactured by TEIJIN TECHNO PRODUCTS LIMITED), which is meta-type wholly aromatic polyamide, was dissolved in a mixed solvent of dimethylacetamide (DMAc) and tripropylene glycol (TPG) in a weight ratio of 80:20. In the resultant polymer solution was dispersed aluminum hydroxide (manufactured by SHOWA DENKO K. K.; H-43M; specific surface area: 9.4 m$^2$/g) having an average particle size of 0.8 μm as an inorganic filler to prepare a coating fluid. The coating fluid was adjusted so that the concentration of CONEX in the coating fluid was 3.0% by weight and the [CONEX:aluminum hydroxide] weight ratio was 10:90 (volume ratio 17:83). Then, two Mayer bars were arranged to face each other, and an appropriate amount of the coating fluid was placed on and between them. Substrate 1 was passed through the Mayer bars having the coating fluid placed thereon to apply the coating fluid to both surfaces of the polyethylene microporous membrane. The clearance between the Mayer bars was set to 30 μm, and the number of both of the two Mayer bars used was #6. The resultant membrane was immersed in a coagulation liquid at 50° C. comprising water:DMAc:TPG=50:40:10 in terms of the weight ratio, and then washed with water and dried, thus obtaining a separator for a nonaqueous secondary battery having a heat-resistant porous layer formed on both surfaces of the polyethylene microporous membrane. The construction of the prepared separator is shown in Table 6, and the physical properties are shown in Table 7. Further, in the separator, the heat-resistant porous layer was so brittle that the occurrence of removal of aluminum hydroxide in the powdery form was recognized.

TABLE 7

| | Thermal shrinkage rate (%) | | Sheet resistance | Gurley value (sec/ | Penetration strength |
|---|---|---|---|---|---|
| | MD | TD | (ohm · cm$^2$) | 100 cc) | (g) |
| Example 3-1 | 9.4 | 8.5 | 3.261 | 260 | 349 |
| Example 3-2 | 6.4 | 5.4 | 3.045 | 210 | 355 |
| Example 3-3 | 6.5 | 8.2 | 3.304 | 280 | 369 |
| Example 3-4 | 8.9 | 8.4 | 5.045 | 376 | 331 |
| Example 3-5 | 7.5 | 7.1 | 3.158 | 244 | 325 |
| Comparative Example 3-1 | 25.6 | 34.7 | 3.041 | 208 | 335 |
| Comparative Example 3-2 | 6.2 | 5.3 | 6.345 | 456 | 364 |
| Comparative Example 3-3 | 18.3 | 25.3 | 3.121 | 211 | 321 |

As apparent from the results shown in Tables 5 to 7, the separators in Examples 3-1 to 3-5 in which the average fibril diameter and average pore size in the heat-resistant porous layer are within their respective ranges in the invention individually have a small thermal shrinkage rate and hence are excellent in heat resistance. Further, the separators in Examples 3-1 to 3-5 individually have a low sheet resistance and a small Gurley value, and therefore exhibit excellent ion permeation when used as a separator for a nonaqueous secondary battery.

On the other hand, the separator in Comparative Example 3-1 in which both the average fibril diameter and average pore size in the heat-resistant porous layer exceed their respective ranges in the invention has a large thermal shrinkage rate and hence is poor in heat resistance.

Further, the separator in Comparative Example 3-2 in which the average pore size in the heat-resistant porous layer is smaller than the range in the invention has a large sheet resistance and a large Gurley value, and therefore exhibits poor ion permeation when used as a separator for a nonaqueous secondary battery.

TABLE 5

| | Weight per unit (g/m$^2$) | Thickness (μm) | Porosity (%) | Specific surface area (m$^2$/g) | Average fibril diameter (nm) | Average pore size (nm) | Sheet resistance (ohm · cm$^2$) | Gurley value (sec/100 cc) | Penetration strength (g) |
|---|---|---|---|---|---|---|---|---|---|
| Substrate 1 | 4.95 | 10.0 | 48 | 73.4 | 57 | 26 | 1.754 | 126 | 313 |
| Substrate 2 | 7.74 | 12.0 | 32 | 32.4 | 130 | 31 | 3.658 | 240 | 302 |

TABLE 6

| | | Separator | | | | Heat-resistant porous layer | | | |
|---|---|---|---|---|---|---|---|---|---|
| | Substrate | Weight per unit (g/m$^2$) | Thickness (μm) | Porosity (%) | Specific surface area (m$^2$/g) | Coating weight (g/m$^2$) | Coating thickness (μm) | Porosity (%) | Average fibril diameter (nm) | Average pore size (nm) |
| Example 3-1 | Substrate 1 | 11.35 | 18.5 | 56 | 42.9 | 6.40 | 8.5 | 64 | 51 | 175 |
| Example 3-2 | Substrate 1 | 10.48 | 18.4 | 57 | 49.7 | 5.53 | 8.4 | 68 | 29 | 146 |
| Example 3-3 | Substrate 1 | 10.69 | 15.6 | 50 | 43.7 | 5.6 | 5.6 | 53 | 45 | 114 |
| Example 3-4 | Substrate 2 | 13.03 | 19.8 | 46 | 27.9 | 5.29 | 7.8 | 64 | 50 | 163 |
| Example 3-5 | Substrate 1 | 13.04 | 17.8 | 56 | 38.7 | 8.09 | 7.8 | 67 | 36 | 117 |
| Comparative Example 3-1 | Substrate 1 | 10.03 | 18.1 | 57 | 43.5 | 5.08 | 8.1 | 69 | 103 | 307 |
| Comparative Example 3-2 | Substrate 1 | 10.66 | 15.3 | 44 | 59.5 | 5.71 | 5.3 | 36 | 29 | 32 |
| Comparative Example 3-3 | Substrate 1 | 9.89 | 20.1 | 63 | 60.4 | 4.94 | 10.1 | 78 | 8 | 135 |

The separator in Comparative Example 3-3 in which the average fibril diameter in the heat-resistant porous layer is smaller than the range in the invention has a large thermal shrinkage rate and hence is poor in heat resistance.

Industrial Applicability

The present invention can be effectively used as a technique for improving the nonaqueous secondary battery in properties.

The invention claimed is:

1. A separator for a nonaqueous secondary battery, comprising a porous composite membrane which includes a substrate comprising a polyolefin microporous membrane and a heat-resistant porous layer comprising a heat-resistant resin, the heat-resistant porous layer being formed on at least one surface of the substrate, wherein the separator for a nonaqueous secondary battery is characterized in that the sheet resistance (A) of the substrate, the Gurley value (B) of the substrate, the sheet resistance (C) of the porous composite membrane, and the Gurley value (D) of the porous composite membrane satisfy the following formulae (1) to (3):

$$0.005 \leq A/B \leq 0.020 \ [\text{ohm} \cdot \text{cm}^2/(\text{sec}/100 \ \text{cc})] \quad (1)$$

$$0.010 \leq C/D \leq 0.025 \ [\text{ohm} \cdot \text{cm}^2/(\text{sec}/100 \ \text{cc})] \quad (2)$$

$$A/B < C/D \quad (3)$$

wherein, in formulae (1) to (3), A represents the sheet resistance [ohm·cm$^2$] of the substrate, B represents the Gurley value [sec/100 cc] of the substrate, C represents the sheet resistance [ohm·cm$^2$] of the porous composite membrane, and D represents the Gurley value [sec/100 cc] of the porous composite membrane, wherein the sheet resistance [ohm·cm$^2$] is a value as measured at 20° C. using an electrolytic solution obtained by dissolving LiBF$_4$ in an amount of 1 mol/L in a mixed solvent of propylene carbonate (PC) and ethylene carbonate (EC) in a weight ratio of 1:1.

2. The separator for a nonaqueous secondary battery according to claim 1, characterized in that the heat-resistant porous layer contains an inorganic filler.

3. The separator for a nonaqueous secondary battery according to claim 2, characterized in that the inorganic filler comprises a metal hydroxide.

4. The separator for a nonaqueous secondary battery according to claim 2, characterized in that the inorganic filler comprises a porous filler.

5. The separator for a nonaqueous secondary battery according to claim 2, characterized in that the heat-resistant porous layer contains the inorganic filler in an amount of 0.4 to 4 times the volume of the heat-resistant resin.

6. The separator for a nonaqueous secondary battery according to claim 2, characterized in that the inorganic filler has an average particle size of 0.1 to 1 μm.

7. The separator for a nonaqueous secondary battery according to claim 1, characterized in that the heat-resistant porous layer has a porosity of 20 to 80%.

8. The separator for a nonaqueous secondary battery according to claim 1, characterized in that the heat-resistant resin is a wholly aromatic polyamide.

9. The separator for a nonaqueous secondary battery according to claim 8, characterized in that the wholly aromatic polyamide is a meta-type wholly aromatic polyamide.

10. The separator for a nonaqueous secondary battery according to claim 1, characterized in that the heat-resistant porous layer is formed on both surfaces of the polyolefin microporous membrane.

* * * * *